(12) United States Patent
Zewail et al.

(10) Patent No.: US 12,302,299 B2
(45) Date of Patent: *May 13, 2025

(54) SLOT FORMAT INDICATOR CONFIGURATIONS

(71) Applicant: QUALCOMM Incorporated, San Diego, CA (US)

(72) Inventors: Ahmed Abdelaziz Ibrahim Abdelaziz Zewail, San Diego, CA (US); Qingjiang Tian, San Diego, CA (US); Jing Sun, San Diego, CA (US); Wooseok Nam, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

This patent is subject to a terminal disclaimer.

(21) Appl. No.: 17/651,497

(22) Filed: Feb. 17, 2022

(65) Prior Publication Data

US 2022/0369316 A1 Nov. 17, 2022

Related U.S. Application Data

(60) Provisional application No. 63/187,038, filed on May 11, 2021.

(51) Int. Cl.
*H04W 72/0453* (2023.01)
*H04W 72/0446* (2023.01)
*H04W 72/23* (2023.01)

(52) U.S. Cl.
CPC ... *H04W 72/0453* (2013.01); *H04W 72/0446* (2013.01); *H04W 72/23* (2023.01)

(58) Field of Classification Search
CPC ......... H04W 72/0453; H04W 72/0446; H04W 72/23; H04L 5/0007; H04L 5/0053; H04L 5/001

See application file for complete search history.

(56) References Cited

U.S. PATENT DOCUMENTS

| | | | |
|---|---|---|---|
| 2019/0191322 A1* | 6/2019 | Sun | H04W 48/12 |
| 2019/0200351 A1* | 6/2019 | Sun | H04L 5/0094 |
| 2020/0028659 A1 | 1/2020 | Huang et al. | |
| 2020/0213068 A1 | 7/2020 | Jo et al. | |
| 2020/0229270 A1* | 7/2020 | Chatterjee | H04L 5/0092 |

OTHER PUBLICATIONS

International Search Report and Written Opinion—PCT/US2022/071784—ISA/EPO—Aug. 26, 2022.
Partial International Search Report—PCT/US2022/071784—ISA/EPO—Jul. 6, 2022.

* cited by examiner

*Primary Examiner* — Rina C Pancholi
(74) *Attorney, Agent, or Firm* — Muncy, Geissler, Olds & Lowe, P.C.

(57) ABSTRACT

In some designs, UE receives an active BWP SCS value of an active BWP SCS that is 120 kHz or higher, and a reference SCS value of a reference SCS that is the same or lower than the active BWP SCS, and determines a number of consecutive slots in the active BWP associated with the same SFI based on the active BWP SCS value and the reference SCS value. UE and BS communicate on slot(s) of the active BWP based on the active BWP SCS value and the reference SCS value. In some designs, a multi-slot SFI configuration is defined for multiple SFIs.

29 Claims, 14 Drawing Sheets

| | 0 | 1 | 2 | 3 | 4 | 5 | 6 | 7 |
|---|---|---|---|---|---|---|---|---|
| 910 | | Slot-Specific SFI | Slot-Specific SFI | Slot-Specific SFI | Slot-Specific SFI | Slot-Specific SFI | Slot-Specific SFI | Slot-Specific SFI |
| 920 | | SFI 1 | SFI 2 | SFI 3 | SFI 4 | SFI 1 | SFI 2 | SFI 4 |
| 930 | | SFI 1 | SFI 1 | SFI 2 | SFI 2 | SFI 3 | SFI 3 | SFI 4 |
| 940 | | SFI 1 | SFI 1 | SFI 2 | SFI 2 | SFI 1 | SFI 1 | SFI 2 |
| 950 | | SFI 1 | SFI 1 | SFI 2 | SFI 2 | SFI 2 | SFI 3 | SFI 4 |
| 960 | | SFI 1 | SFI 2 | SFI 3 | SFI 4 | SFI 1 | SFI 3 | SFI 2 |

*FIG. 9*

SLOT FORMAT INDICATOR CONFIGURATIONS

CROSS-REFERENCE TO RELATED APPLICATIONS

The present application for patent claims the benefit of U.S. Provisional Application No. 63/187,038, entitled "SLOT FORMAT INDICATOR CONFIGURATIONS," filed May 11, 2021, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes receiving, from a network entity, an active bandwidth part (BWP) subcarrier spacing (SCS) value of an active BWP SCS that is 120 kHz or higher, and a reference SCS value of a reference SCS that is the same or lower than the active BWP SCS; determining a number of consecutive slots in the active BWP associated with the same slot format indicator (SFI) based on the active BWP SCS value and the reference SCS value; communicating with the network entity on one or more slots of the active BWP in accordance with the determination.

In some aspects, the active BWP corresponds to a downlink BWP.

In some aspects, the active BWP corresponds to an uplink BWP.

In some aspects, the active BWP SCS value is received via downlink control information (DCI).

In some aspects, the reference SCS value is received via downlink control information (DCI).

In some aspects, the active BWP SCS is 960 kHz or 480 kHz or 120 kHz, and the reference SCS is 480 kHz, 240 kHz, 120 kHz, or less than 120 kHz.

In some aspects, the reference SCS value has a maximum of three.

In some aspects, reference SCS value is greater than three.

In an aspect, a method of operating a network entity includes determining an active bandwidth part (BWP) subcarrier spacing (SCS) value of an active BWP SCS that is 120 kHz or higher, and a reference SCS value of a reference SCS that is the same or lower than the active BWP SCS, wherein a number of consecutive slots in the active BWP associated with the same slot format indicator (SFI) is based on the active BWP SCS value and the reference SCS value; transmitting the active BWP SCS value and the reference SCS value to a user equipment (UE); and communicating with the UE on one or more slots of the active BWP in accordance with the SFI.

In some aspects, the active BWP corresponds to a downlink BWP.

In some aspects, the active BWP corresponds to an uplink BWP.

In some aspects, the active BWP SCS value is transmitted via downlink control information (DCI).

In some aspects, the reference SCS value is transmitted via downlink control information (DCI).

In some aspects, the active BWP SCS is 960 kHz or 480 kHz or 120 kHz, and the reference SCS is 480 kHz, 240 kHz, 120 kHz, or less than 120 kHz.

In some aspects, the reference SCS value has a maximum of three.

In some aspects, reference SCS value is greater than three.

In an aspect, a method of operating a user equipment (UE) includes receiving, from a network entity, an indication of a slot format indicator (SFI) configuration for a plurality of slots, the SFI configuration including a first SFI associated with a first subset of the plurality of slots and a second SFI associated with a second subset of the plurality of slots; and communicating with the network entity on one or more of the plurality of slots in accordance with the SFI configuration.

In some aspects, the plurality of slots includes at least each slot between two consecutive physical downlink control channel (PDCCH) occasions.

In some aspects, the first SFI is associated with a first slot repetition factor, and the SFI is associated with a second slot repetition factor.

In some aspects, the first and second slot repetition factors are the same.

In some aspects, the first and second slot repetition factors are different.

In some aspects, the SFI configuration designates an SFI slot pattern comprising the first and second SFIs that repeats at least partially across the plurality of slots.

In some aspects, wherein, upon reaching a respective slot repetition factor for a respective SFI, the respective SFI is removed from the SFI slot pattern for any subsequent repetitions of the SFI slot pattern.

In some aspects, individual slots associated with the first SFI are interleaved with individual slots associated with the second SFI.

In some aspects, the SFI configuration includes a first contiguous group of slots including all of the first subset of slots associated with the first SFI, followed by a second contiguous group of slots including all of the second subset of slots associated with the second SFI.

In some aspects, a first number of slots among the first contiguous group of slots is the same as a second number of slots among the second contiguous group of slots.

In some aspects, a first number of slots among each first contiguous group of slots is different than a second number of slots among each second contiguous group of slots.

In some aspects, the SFI configuration includes first contiguous groups of slots associated with the first SFI that are interleaved with second contiguous groups of slots associated with the second SFI.

In some aspects, a first number of slots among each first contiguous group of slots is the same as a second number of slots among each second contiguous group of slots.

In some aspects, a first number of slots among each first contiguous group of slots is different than a second number of slots among each second contiguous group of slots.

In some aspects, the SFI configuration is received via downlink control information (DCI).

In some aspects, the UE is preconfigured with a plurality of SFI configuration options for the plurality of slots, and the receiving receives an indication of one of the plurality of SFI configuration options.

In some aspects, the indication comprises a number of SFIs included in the SFI configuration, and the SFI configuration is determined based on the number of SFIs and a pre-defined SFI-to-slot mapping rule.

In some aspects, the pre-defined SFI-to-slot mapping rule divides the plurality of slots by the indicated number of SFIs to obtain a plurality of contiguous groups of slots, and assigns one of the plurality of contiguous groups to each of a plurality of SFIs.

In some aspects, the indicated number of SFIs is UE-specific.

In some aspects, the indication is received in association with fewer SFI indexes than the number of SFIs.

In some aspects, one or more SFI index fields are configured via radio resource control (RRC) configuration with reserved or invalid entries that are not associated with a respective SFI.

In some aspects, the number of SFIs is indicated via a field in a downlink control information (DCI).

In some aspects, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

In an aspect, a method of operating a network entity includes determining a slot format indicator (SFI) configuration for a plurality of slots, the SFI configuration including a first SFI associated with a first subset of the plurality of slots and a second SFI associated with a second subset of the plurality of slots; transmitting an indication of the SFI configuration to a user equipment (UE); and communicating with the UE on one or more of the plurality of slots in accordance with the SFI configuration.

In some aspects, the plurality of slots includes at least each slot between two consecutive physical downlink control channel (PDCCH) occasions.

In some aspects, the first SFI is associated with a first slot repetition factor, and the SFI is associated with a second slot repetition factor.

In some aspects, the first and second slot repetition factors are the same.

In some aspects, the first and second slot repetition factors are different.

In some aspects, the SFI configuration designates an SFI slot pattern comprising the first and second SFIs that repeats at least partially across the plurality of slots.

In some aspects, wherein, upon reaching a respective slot repetition factor for a respective SFI, the respective SFI is removed from the SFI slot pattern for any subsequent repetitions of the SFI slot pattern.

In some aspects, individual slots associated with the first SFI are interleaved with individual slots associated with the second SFI.

In some aspects, the SFI configuration includes a first contiguous group of slots including all of the first subset of slots associated with the first SFI, followed by a second contiguous group of slots including all of the second subset of slots associated with the second SFI.

In some aspects, a first number of slots among the first contiguous group of slots is the same as a second number of slots among the second contiguous group of slots.

In some aspects, a first number of slots among each first contiguous group of slots is different than a second number of slots among each second contiguous group of slots.

In some aspects, the SFI configuration includes first contiguous groups of slots associated with the first SFI that are interleaved with second contiguous groups of slots associated with the second SFI.

In some aspects, a first number of slots among each first contiguous group of slots is the same as a second number of slots among each second contiguous group of slots.

In some aspects, a first number of slots among each first contiguous group of slots is different than a second number of slots among each second contiguous group of slots.

In some aspects, the SFI configuration is transmitted via downlink control information (DCI).

In some aspects, the UE is preconfigured with a plurality of SFI configuration options for the plurality of slots, and the transmitting transmits an indication of one of the plurality of SFI configuration options.

In some aspects, the indication comprises a number of SFIs included in the SFI configuration, and the SFI configuration is determined based on the number of SFIs and a pre-defined SFI-to-slot mapping rule.

In some aspects, the pre-defined SFI-to-slot mapping rule divides the plurality of slots by the indicated number of SFIs to obtain a plurality of contiguous groups of slots, and assigns one of the plurality of contiguous groups to each of a plurality of SFIs.

In some aspects, the indicated number of SFIs is UE-specific.

In some aspects, the indication is transmitted in association with fewer SFI indexes than the number of SFIs.

In some aspects, one or more SFI index fields are configured via radio resource control (RRC) configuration with reserved or invalid entries that are not associated with a respective SFI.

In some aspects, the number of SFIs is indicated via a field in a downlink control information (DCI).

In some aspects, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

In an aspect, a user equipment (UE) includes a memory; at least one transceiver; and at least one processor communicatively coupled to the memory and the at least one transceiver, the at least one processor configured to: receive, via the at least one transceiver, from a network entity, an active bandwidth part (BWP) subcarrier spacing (SCS) value of an active BWP SCS that is 120 kHz or higher, and a reference SCS value of a reference SCS that is the same or lower than the active BWP SCS; determine a number of consecutive slots in the active BWP associated with the same slot format indicator (SFI) based on the active BWP SCS value and the reference SCS value; communicate, via the at least one transceiver, with the network entity on one or more slots of the active BWP in accordance with the determination.

In some aspects, the active BWP corresponds to a downlink BWP.

In some aspects, the active BWP corresponds to an uplink BWP.

In some aspects, the active BWP SCS value is received via downlink control information (DCI).

In some aspects, the reference SCS value is received via downlink control information (DCI).

In some aspects, the active BWP SCS is 960 kHz or 480 kHz or 120 kHz, and the reference SCS is 480 kHz, 240 kHz, 120 kHz, or less than 120 kHz.

In some aspects, the reference SCS value has a maximum of three.

In some aspects, reference SCS value is greater than three.

In an aspect, a network entity includes a memory; at least one transceiver; and at least one processor communicatively coupled to the memory and the at least one transceiver, the at least one processor configured to: determine an active bandwidth part (BWP) subcarrier spacing (SCS) value of an active BWP SCS that is 120 kHz or higher, and a reference SCS value of a reference SCS that is the same or lower than the active BWP SCS, wherein a number of consecutive slots in the active BWP associated with the same slot format indicator (SFI) is based on the active BWP SCS value and the reference SCS value; transmit, via the at least one transceiver, the active BWP SCS value and the reference SCS value to a user equipment (UE); and communicate, via the at least one transceiver, with the UE on one or more slots of the active BWP in accordance with the SFI.

In some aspects, the active BWP corresponds to a downlink BWP.

In some aspects, the active BWP corresponds to an uplink BWP.

In some aspects, the active BWP SCS value is transmitted via downlink control information (DCI).

In some aspects, the reference SCS value is transmitted via downlink control information (DCI).

In some aspects, the active BWP SCS is 960 kHz or 480 kHz or 120 kHz, and the reference SCS is 480 kHz, 240 kHz, 120 kHz, or less than 120 kHz.

In some aspects, the reference SCS value has a maximum of three.

In some aspects, reference SCS value is greater than three.

In an aspect, a UE includes a memory; at least one transceiver; and at least one processor communicatively coupled to the memory and the at least one transceiver, the at least one processor configured to: receive, via the at least one transceiver, from a network entity, an indication of a slot format indicator (SFI) configuration for a plurality of slots, the SFI configuration including a first SFI associated with a first subset of the plurality of slots and a second SFI associated with a second subset of the plurality of slots; and communicate, via the at least one transceiver, with the network entity on one or more of the plurality of slots in accordance with the SFI configuration.

In some aspects, the plurality of slots includes at least each slot between two consecutive physical downlink control channel (PDCCH) occasions.

In some aspects, the first SFI is associated with a first slot repetition factor, and the SFI is associated with a second slot repetition factor.

In some aspects, the first and second slot repetition factors are the same.

In some aspects, the first and second slot repetition factors are different.

In some aspects, the SFI configuration designates an SFI slot pattern comprising the first and second SFIs that repeats at least partially across the plurality of slots.

In some aspects, wherein, upon reaching a respective slot repetition factor for a respective SFI, the respective SFI is removed from the SFI slot pattern for any subsequent repetitions of the SFI slot pattern.

In some aspects, individual slots associated with the first SFI are interleaved with individual slots associated with the second SFI.

In some aspects, the SFI configuration includes a first contiguous group of slots including all of the first subset of slots associated with the first SFI, followed by a second contiguous group of slots including all of the second subset of slots associated with the second SFI.

In some aspects, a first number of slots among the first contiguous group of slots is the same as a second number of slots among the second contiguous group of slots.

In some aspects, a first number of slots among each first contiguous group of slots is different than a second number of slots among each second contiguous group of slots.

In some aspects, the SFI configuration includes first contiguous groups of slots associated with the first SFI that are interleaved with second contiguous groups of slots associated with the second SFI.

In some aspects, a first number of slots among each first contiguous group of slots is the same as a second number of slots among each second contiguous group of slots.

In some aspects, a first number of slots among each first contiguous group of slots is different than a second number of slots among each second contiguous group of slots.

In some aspects, the SFI configuration is received via downlink control information (DCI).

In some aspects, the UE is preconfigured with a plurality of SFI configuration options for the plurality of slots, and the receiving receives an indication of one of the plurality of SFI configuration options.

In some aspects, the indication comprises a number of SFIs included in the SFI configuration, and the SFI configuration is determined based on the number of SFIs and a pre-defined SFI-to-slot mapping rule.

In some aspects, the pre-defined SFI-to-slot mapping rule divides the plurality of slots by the indicated number of SFIs to obtain a plurality of contiguous groups of slots, and assigns one of the plurality of contiguous groups to each of a plurality of SFIs.

In some aspects, the indicated number of SFIs is UE-specific.

In some aspects, the indication is received in association with fewer SFI indexes than the number of SFIs.

In some aspects, one or more SFI index fields are configured via radio resource control (RRC) configuration with reserved or invalid entries that are not associated with a respective SFI.

In some aspects, the number of SFIs is indicated via a field in a downlink control information (DCI).

In some aspects, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

In an aspect, a network entity includes a memory; at least one transceiver; and at least one processor communicatively coupled to the memory and the at least one transceiver, the at least one processor configured to: determine a slot format indicator (SFI) configuration for a plurality of slots, the SFI configuration including a first SFI associated with a first subset of the plurality of slots and a second SFI associated with a second subset of the plurality of slots; transmit, via the at least one transceiver, an indication of the SFI configuration to a user equipment (UE); and communicate, via the at least one transceiver, with the UE on one or more of the plurality of slots in accordance with the SFI configuration.

In some aspects, the plurality of slots includes at least each slot between two consecutive physical downlink control channel (PDCCH) occasions.

In some aspects, the first SFI is associated with a first slot repetition factor, and the SFI is associated with a second slot repetition factor.

In some aspects, the first and second slot repetition factors are the same.

In some aspects, the first and second slot repetition factors are different.

In some aspects, the SFI configuration designates an SFI slot pattern comprising the first and second SFIs that repeats at least partially across the plurality of slots.

In some aspects, wherein, upon reaching a respective slot repetition factor for a respective SFI, the respective SFI is removed from the SFI slot pattern for any subsequent repetitions of the SFI slot pattern.

In some aspects, individual slots associated with the first SFI are interleaved with individual slots associated with the second SFI.

In some aspects, the SFI configuration includes a first contiguous group of slots including all of the first subset of slots associated with the first SFI, followed by a second contiguous group of slots including all of the second subset of slots associated with the second SFI.

In some aspects, a first number of slots among the first contiguous group of slots is the same as a second number of slots among the second contiguous group of slots.

In some aspects, a first number of slots among each first contiguous group of slots is different than a second number of slots among each second contiguous group of slots.

In some aspects, the SFI configuration includes first contiguous groups of slots associated with the first SFI that are interleaved with second contiguous groups of slots associated with the second SFI.

In some aspects, a first number of slots among each first contiguous group of slots is the same as a second number of slots among each second contiguous group of slots.

In some aspects, a first number of slots among each first contiguous group of slots is different than a second number of slots among each second contiguous group of slots.

In some aspects, the SFI configuration is transmitted via downlink control information (DCI).

In some aspects, the UE is preconfigured with a plurality of SFI configuration options for the plurality of slots, and the transmitting transmits an indication of one of the plurality of SFI configuration options.

In some aspects, the indication comprises a number of SFIs included in the SFI configuration, and the SFI configuration is determined based on the number of SFIs and a pre-defined SFI-to-slot mapping rule.

In some aspects, the pre-defined SFI-to-slot mapping rule divides the plurality of slots by the indicated number of SFIs to obtain a plurality of contiguous groups of slots, and assigns one of the plurality of contiguous groups to each of a plurality of SFIs.

In some aspects, the indicated number of SFIs is UE-specific.

In some aspects, the indication is transmitted in association with fewer SFI indexes than the number of SFIs.

In some aspects, one or more SFI index fields are configured via radio resource control (RRC) configuration with reserved or invalid entries that are not associated with a respective SFI.

In some aspects, the number of SFIs is indicated via a field in a downlink control information (DCI).

In some aspects, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

In an aspect, a user equipment (UE) includes means for receiving, from a network entity, an active bandwidth part (BWP) subcarrier spacing (SCS) value of an active BWP SCS that is 120 kHz or higher, and a reference SCS value of a reference SCS that is the same or lower than the active BWP SCS; means for determining a number of consecutive slots in the active BWP associated with the same slot format indicator (SFI) based on the active BWP SCS value and the reference SCS value; means for communicating with the network entity on one or more slots of the active BWP in accordance with the determination.

In some aspects, the active BWP corresponds to a downlink BWP.

In some aspects, the active BWP corresponds to an uplink BWP.

In some aspects, the active BWP SCS value is received via downlink control information (DCI).

In some aspects, the reference SCS value is received via downlink control information (DCI).

In some aspects, the active BWP SCS is 960 kHz or 480 kHz or 120 kHz, and the reference SCS is 480 kHz, 240 kHz, 120 kHz, or less than 120 kHz.

In some aspects, the reference SCS value has a maximum of three.

In some aspects, reference SCS value is greater than three.

In an aspect, a network entity includes means for determining an active bandwidth part (BWP) subcarrier spacing (SCS) value of an active BWP SCS that is 120 kHz or higher, and a reference SCS value of a reference SCS that is the same or lower than the active BWP SCS, wherein a number of consecutive slots in the active BWP associated with the same slot format indicator (SFI) is based on the active BWP SCS value and the reference SCS value; means for transmitting the active BWP SCS value and the reference SCS value to a user equipment (UE); and means for communicating with the UE on one or more slots of the active BWP in accordance with the SFI.

In some aspects, the active BWP corresponds to a downlink BWP.

In some aspects, the active BWP corresponds to an uplink BWP.

In some aspects, the active BWP SCS value is transmitted via downlink control information (DCI).

In some aspects, the reference SCS value is transmitted via downlink control information (DCI).

In some aspects, the active BWP SCS is 960 kHz or 480 kHz or 120 kHz, and the reference SCS is 480 kHz, 240 kHz, 120 kHz, or less than 120 kHz.

In some aspects, the reference SCS value has a maximum of three.

In some aspects, reference SCS value is greater than three.

In an aspect, a UE includes means for receiving, from a network entity, an indication of a slot format indicator (SFI) configuration for a plurality of slots, the SFI configuration including a first SFI associated with a first subset of the plurality of slots and a second SFI associated with a second subset of the plurality of slots; and means for communicating with the network entity on one or more of the plurality of slots in accordance with the SFI configuration.

In some aspects, the plurality of slots includes at least each slot between two consecutive physical downlink control channel (PDCCH) occasions.

In some aspects, the first SFI is associated with a first slot repetition factor, and the SFI is associated with a second slot repetition factor.

In some aspects, the first and second slot repetition factors are the same.

In some aspects, the first and second slot repetition factors are different.

In some aspects, the SFI configuration designates an SFI slot pattern comprising the first and second SFIs that repeats at least partially across the plurality of slots.

In some aspects, wherein, upon reaching a respective slot repetition factor for a respective SFI, the respective SFI is removed from the SFI slot pattern for any subsequent repetitions of the SFI slot pattern.

In some aspects, individual slots associated with the first SFI are interleaved with individual slots associated with the second SFI.

In some aspects, the SFI configuration includes a first contiguous group of slots including all of the first subset of slots associated with the first SFI, followed by a second contiguous group of slots including all of the second subset of slots associated with the second SFI.

In some aspects, a first number of slots among the first contiguous group of slots is the same as a second number of slots among the second contiguous group of slots.

In some aspects, a first number of slots among each first contiguous group of slots is different than a second number of slots among each second contiguous group of slots.

In some aspects, the SFI configuration includes first contiguous groups of slots associated with the first SFI that are interleaved with second contiguous groups of slots associated with the second SFI.

In some aspects, a first number of slots among each first contiguous group of slots is the same as a second number of slots among each second contiguous group of slots.

In some aspects, a first number of slots among each first contiguous group of slots is different than a second number of slots among each second contiguous group of slots.

In some aspects, the SFI configuration is received via downlink control information (DCI).

In some aspects, the UE is preconfigured with a plurality of SFI configuration options for the plurality of slots, and the receiving receives an indication of one of the plurality of SFI configuration options.

In some aspects, the indication comprises a number of SFIs included in the SFI configuration, and the SFI configuration is determined based on the number of SFIs and a pre-defined SFI-to-slot mapping rule.

In some aspects, the pre-defined SFI-to-slot mapping rule divides the plurality of slots by the indicated number of SFIs to obtain a plurality of contiguous groups of slots, and assigns one of the plurality of contiguous groups to each of a plurality of SFIs.

In some aspects, the indicated number of SFIs is UE-specific.

In some aspects, the indication is received in association with fewer SFI indexes than the number of SFIs.

In some aspects, one or more SFI index fields are configured via radio resource control (RRC) configuration with reserved or invalid entries that are not associated with a respective SFI.

In some aspects, the number of SFIs is indicated via a field in a downlink control information (DCI).

In some aspects, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

In an aspect, a network entity includes means for determining a slot format indicator (SFI) configuration for a plurality of slots, the SFI configuration including a first SFI associated with a first subset of the plurality of slots and a second SFI associated with a second subset of the plurality of slots; means for transmitting an indication of the SFI configuration to a user equipment (UE); and means for communicating with the UE on one or more of the plurality of slots in accordance with the SFI configuration.

In some aspects, the plurality of slots includes at least each slot between two consecutive physical downlink control channel (PDCCH) occasions.

In some aspects, the first SFI is associated with a first slot repetition factor, and the SFI is associated with a second slot repetition factor.

In some aspects, the first and second slot repetition factors are the same.

In some aspects, the first and second slot repetition factors are different.

In some aspects, the SFI configuration designates an SFI slot pattern comprising the first and second SFIs that repeats at least partially across the plurality of slots.

In some aspects, wherein, upon reaching a respective slot repetition factor for a respective SFI, the respective SFI is removed from the SFI slot pattern for any subsequent repetitions of the SFI slot pattern.

In some aspects, individual slots associated with the first SFI are interleaved with individual slots associated with the second SFI.

In some aspects, the SFI configuration includes a first contiguous group of slots including all of the first subset of slots associated with the first SFI, followed by a second contiguous group of slots including all of the second subset of slots associated with the second SFI.

In some aspects, a first number of slots among the first contiguous group of slots is the same as a second number of slots among the second contiguous group of slots.

In some aspects, a first number of slots among each first contiguous group of slots is different than a second number of slots among each second contiguous group of slots.

In some aspects, the SFI configuration includes first contiguous groups of slots associated with the first SFI that are interleaved with second contiguous groups of slots associated with the second SFI.

In some aspects, a first number of slots among each first contiguous group of slots is the same as a second number of slots among each second contiguous group of slots.

In some aspects, a first number of slots among each first contiguous group of slots is different than a second number of slots among each second contiguous group of slots.

In some aspects, the SFI configuration is transmitted via downlink control information (DCI).

In some aspects, the UE is preconfigured with a plurality of SFI configuration options for the plurality of slots, and the transmitting transmits an indication of one of the plurality of SFI configuration options.

In some aspects, the indication comprises a number of SFIs included in the SFI configuration, and the SFI configuration is determined based on the number of SFIs and a pre-defined SFI-to-slot mapping rule.

In some aspects, the pre-defined SFI-to-slot mapping rule divides the plurality of slots by the indicated number of SFIs to obtain a plurality of contiguous groups of slots, and assigns one of the plurality of contiguous groups to each of a plurality of SFIs.

In some aspects, the indicated number of SFIs is UE-specific.

In some aspects, the indication is transmitted in association with fewer SFI indexes than the number of SFIs.

In some aspects, one or more SFI index fields are configured via radio resource control (RRC) configuration with reserved or invalid entries that are not associated with a respective SFI.

In some aspects, the number of SFIs is indicated via a field in a downlink control information (DCI).

In some aspects, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

In an aspect, a non-transitory computer-readable medium storing computer-executable instructions that, when executed by a user equipment (UE), cause the UE to: receive, from a network entity, an active bandwidth part (BWP) subcarrier spacing (SCS) value of an active BWP SCS that is 120 kHz or higher, and a reference SCS value of a reference SCS that is the same or lower than the active BWP SCS; determine a number of consecutive slots in the active BWP associated with the same slot format indicator (SFI) based on the active BWP SCS value and the reference SCS value; communicate with the network entity on one or more slots of the active BWP in accordance with the determination.

In some aspects, the active BWP corresponds to a downlink BWP.

In some aspects, the active BWP corresponds to an uplink BWP.

In some aspects, the active BWP SCS value is received via downlink control information (DCI).

In some aspects, the reference SCS value is received via downlink control information (DCI).

In some aspects, the active BWP SCS is 960 kHz or 480 kHz or 120 kHz, and the reference SCS is 480 kHz, 240 kHz, 120 kHz, or less than 120 kHz.

In some aspects, the reference SCS value has a maximum of three.

In some aspects, reference SCS value is greater than three.

In an aspect, a non-transitory computer-readable medium storing computer-executable instructions that, when executed by a network entity, cause the network entity to: determine an active bandwidth part (BWP) subcarrier spacing (SCS) value of an active BWP SCS that is 120 kHz or higher, and a reference SCS value of a reference SCS that is the same or lower than the active BWP SCS, wherein a number of consecutive slots in the active BWP associated with the same slot format indicator (SFI) is based on the active BWP SCS value and the reference SCS value; transmit the active BWP SCS value and the reference SCS value to a user equipment (UE); and communicate with the UE on one or more slots of the active BWP in accordance with the SFI.

In some aspects, the active BWP corresponds to a downlink BWP.

In some aspects, the active BWP corresponds to an uplink BWP.

In some aspects, the active BWP SCS value is transmitted via downlink control information (DCI).

In some aspects, the reference SCS value is transmitted via downlink control information (DCI).

In some aspects, the active BWP SCS is 960 kHz or 480 kHz or 120 kHz, and the reference SCS is 480 kHz, 240 kHz, 120 kHz, or less than 120 kHz.

In some aspects, the reference SCS value has a maximum of three.

In some aspects, reference SCS value is greater than three.

In an aspect, a non-transitory computer-readable medium storing computer-executable instructions that, when executed by a UE, cause the UE to: receive, from a network entity, an indication of a slot format indicator (SFI) configuration for a plurality of slots, the SFI configuration including a first SFI associated with a first subset of the plurality of slots and a second SFI associated with a second subset of the plurality of slots; and communicate with the network entity on one or more of the plurality of slots in accordance with the SFI configuration.

In some aspects, the plurality of slots includes at least each slot between two consecutive physical downlink control channel (PDCCH) occasions.

In some aspects, the first SFI is associated with a first slot repetition factor, and the SFI is associated with a second slot repetition factor.

In some aspects, the first and second slot repetition factors are the same.

In some aspects, the first and second slot repetition factors are different.

In some aspects, the SFI configuration designates an SFI slot pattern comprising the first and second SFIs that repeats at least partially across the plurality of slots.

In some aspects, wherein, upon reaching a respective slot repetition factor for a respective SFI, the respective SFI is removed from the SFI slot pattern for any subsequent repetitions of the SFI slot pattern.

In some aspects, individual slots associated with the first SFI are interleaved with individual slots associated with the second SFI.

In some aspects, the SFI configuration includes a first contiguous group of slots including all of the first subset of slots associated with the first SFI, followed by a second contiguous group of slots including all of the second subset of slots associated with the second SFI.

In some aspects, a first number of slots among the first contiguous group of slots is the same as a second number of slots among the second contiguous group of slots.

In some aspects, a first number of slots among each first contiguous group of slots is different than a second number of slots among each second contiguous group of slots.

In some aspects, the SFI configuration includes first contiguous groups of slots associated with the first SFI that are interleaved with second contiguous groups of slots associated with the second SFI.

In some aspects, a first number of slots among each first contiguous group of slots is the same as a second number of slots among each second contiguous group of slots.

In some aspects, a first number of slots among each first contiguous group of slots is different than a second number of slots among each second contiguous group of slots.

In some aspects, the SFI configuration is received via downlink control information (DCI).

In some aspects, the UE is preconfigured with a plurality of SFI configuration options for the plurality of slots, and the receiving receives an indication of one of the plurality of SFI configuration options.

In some aspects, the indication comprises a number of SFIs included in the SFI configuration, and the SFI configuration is determined based on the number of SFIs and a pre-defined SFI-to-slot mapping rule.

In some aspects, the pre-defined SFI-to-slot mapping rule divides the plurality of slots by the indicated number of SFIs to obtain a plurality of contiguous groups of slots, and assigns one of the plurality of contiguous groups to each of a plurality of SFIs.

In some aspects, the indicated number of SFIs is UE-specific.

In some aspects, the indication is received in association with fewer SFI indexes than the number of SFIs.

In some aspects, one or more SFI index fields are configured via radio resource control (RRC) configuration with reserved or invalid entries that are not associated with a respective SFI.

In some aspects, the number of SFIs is indicated via a field in a downlink control information (DCI).

In some aspects, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

In an aspect, a non-transitory computer-readable medium storing computer-executable instructions that, when executed by a network entity, cause the network entity to: determine a slot format indicator (SFI) configuration for a plurality of slots, the SFI configuration including a first SFI associated with a first subset of the plurality of slots and a second SFI associated with a second subset of the plurality of slots; transmit an indication of the SFI configuration to a user equipment (UE); and communicate with the UE on one or more of the plurality of slots in accordance with the SFI configuration.

In some aspects, the plurality of slots includes at least each slot between two consecutive physical downlink control channel (PDCCH) occasions.

In some aspects, the first SFI is associated with a first slot repetition factor, and the SFI is associated with a second slot repetition factor.

In some aspects, the first and second slot repetition factors are the same.

In some aspects, the first and second slot repetition factors are different.

In some aspects, the SFI configuration designates an SFI slot pattern comprising the first and second SFIs that repeats at least partially across the plurality of slots.

In some aspects, wherein, upon reaching a respective slot repetition factor for a respective SFI, the respective SFI is removed from the SFI slot pattern for any subsequent repetitions of the SFI slot pattern.

In some aspects, individual slots associated with the first SFI are interleaved with individual slots associated with the second SFI.

In some aspects, the SFI configuration includes a first contiguous group of slots including all of the first subset of slots associated with the first SFI, followed by a second contiguous group of slots including all of the second subset of slots associated with the second SFI.

In some aspects, a first number of slots among the first contiguous group of slots is the same as a second number of slots among the second contiguous group of slots.

In some aspects, a first number of slots among each first contiguous group of slots is different than a second number of slots among each second contiguous group of slots.

In some aspects, the SFI configuration includes first contiguous groups of slots associated with the first SFI that are interleaved with second contiguous groups of slots associated with the second SFI.

In some aspects, a first number of slots among each first contiguous group of slots is the same as a second number of slots among each second contiguous group of slots.

In some aspects, a first number of slots among each first contiguous group of slots is different than a second number of slots among each second contiguous group of slots.

In some aspects, the SFI configuration is transmitted via downlink control information (DCI).

In some aspects, the UE is preconfigured with a plurality of SFI configuration options for the plurality of slots, and the transmitting transmits an indication of one of the plurality of SFI configuration options.

In some aspects, the indication comprises a number of SFIs included in the SFI configuration, and the SFI configuration is determined based on the number of SFIs and a pre-defined SFI-to-slot mapping rule.

In some aspects, the pre-defined SFI-to-slot mapping rule divides the plurality of slots by the indicated number of SFIs to obtain a plurality of contiguous groups of slots, and assigns one of the plurality of contiguous groups to each of a plurality of SFIs.

In some aspects, the indicated number of SFIs is UE-specific.

In some aspects, the indication is transmitted in association with fewer SFI indexes than the number of SFIs.

In some aspects, one or more SFI index fields are configured via radio resource control (RRC) configuration with reserved or invalid entries that are not associated with a respective SFI.

In some aspects, the number of SFIs is indicated via a field in a downlink control information (DCI).

In some aspects, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 9 illustrates various SFI configurations across slots 0 . . . 7 in accordance with aspects of the disclosure.

DETAILED DESCRIPTION

Figure 1:
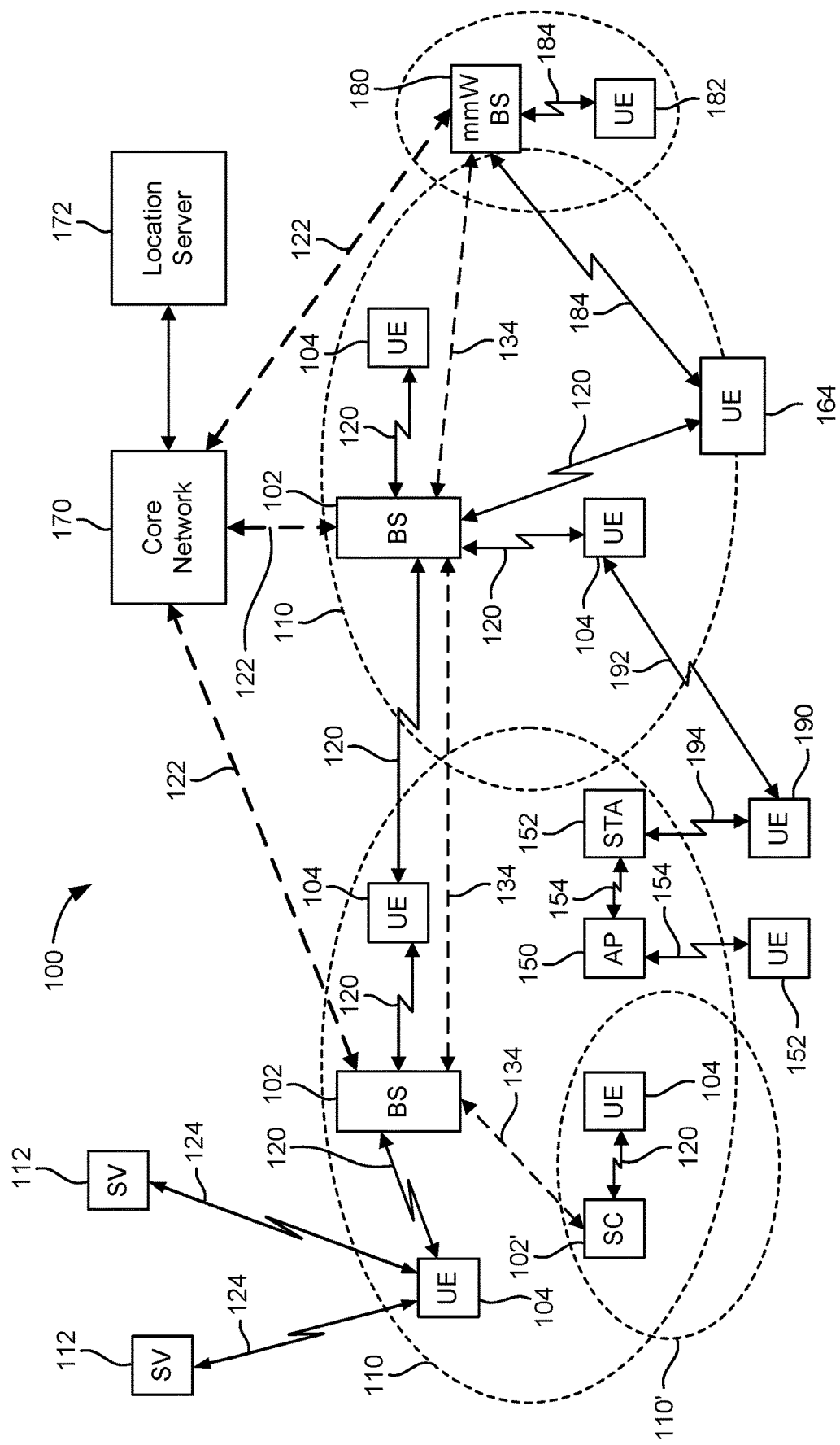
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
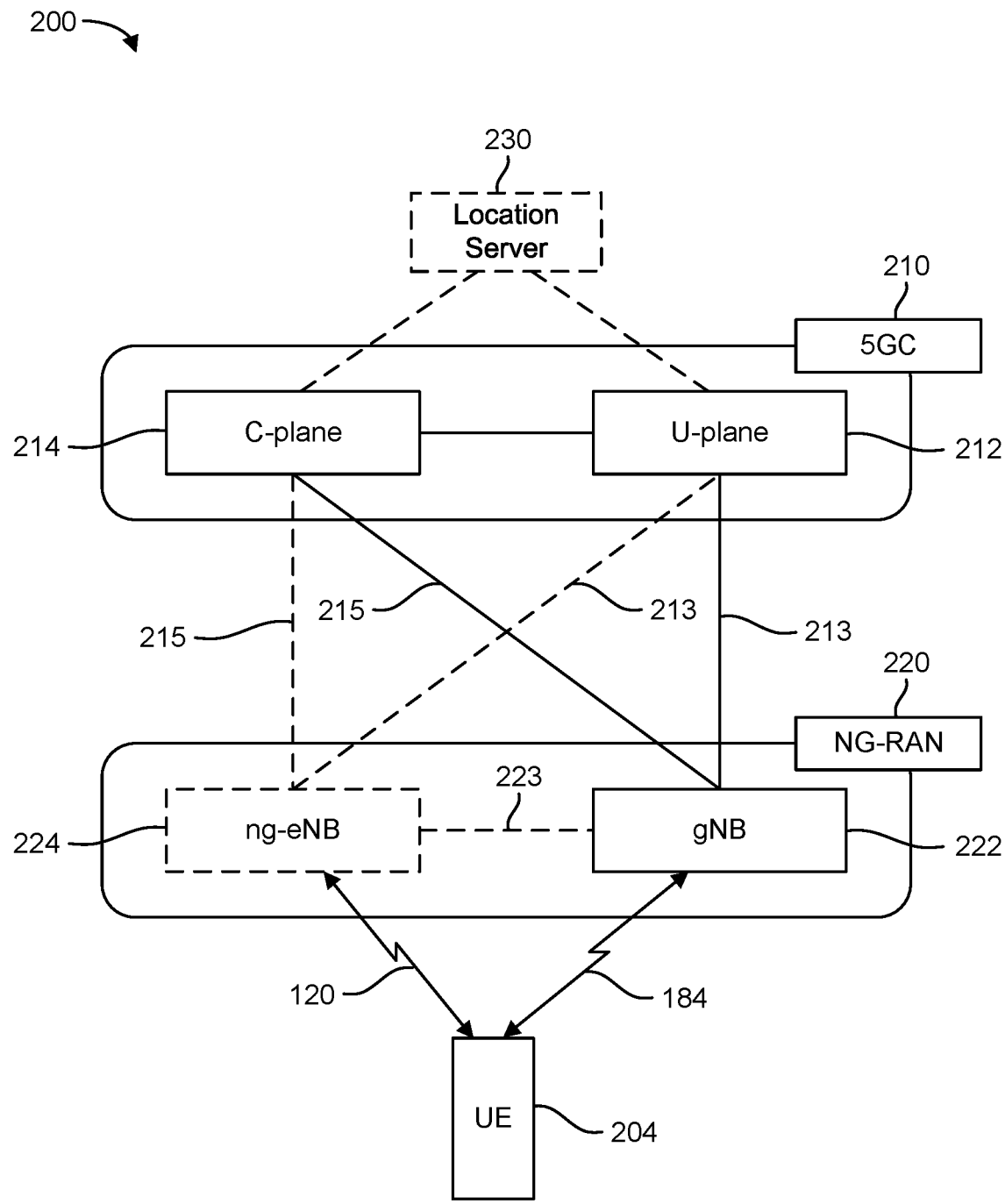
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
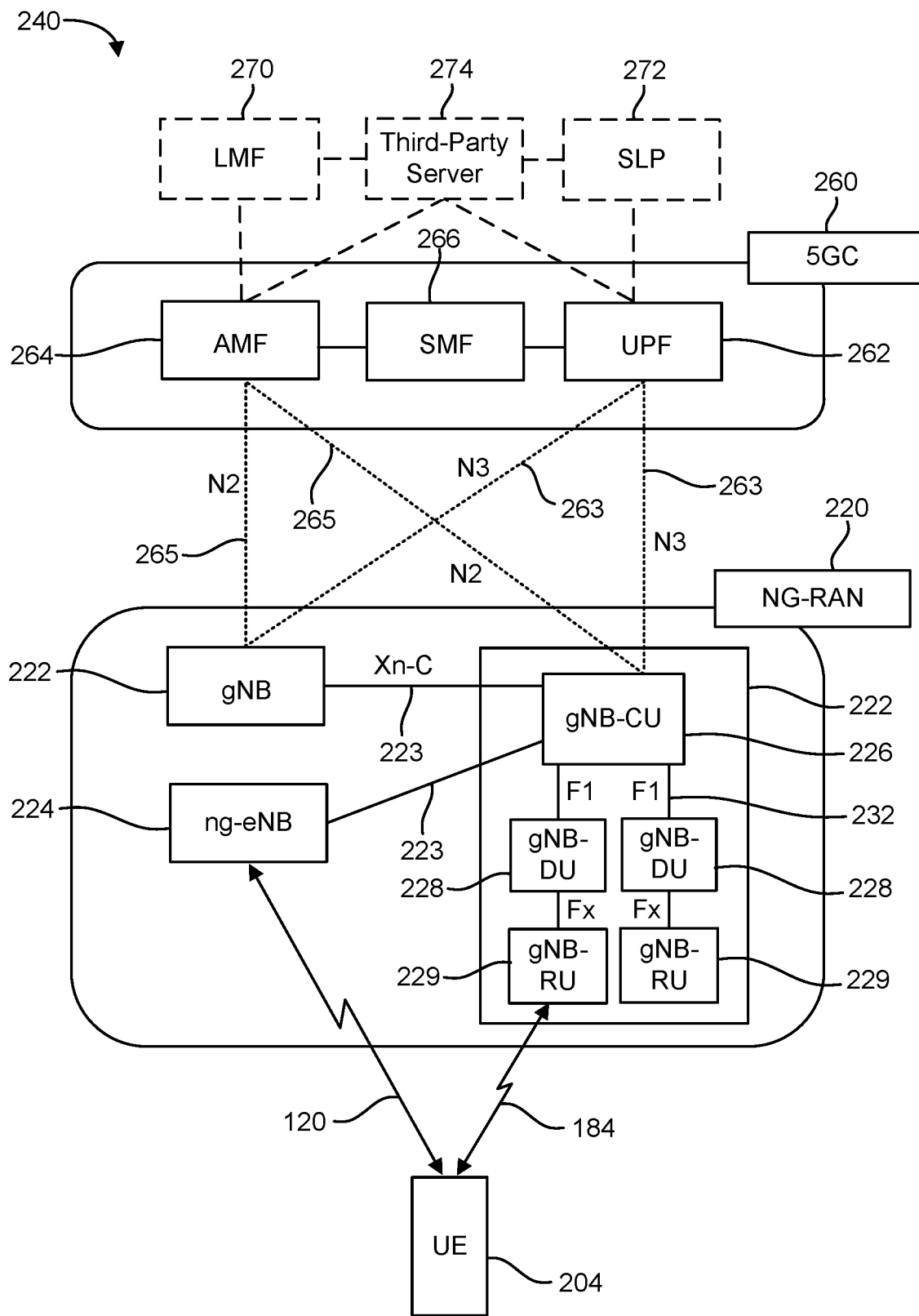

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F 1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
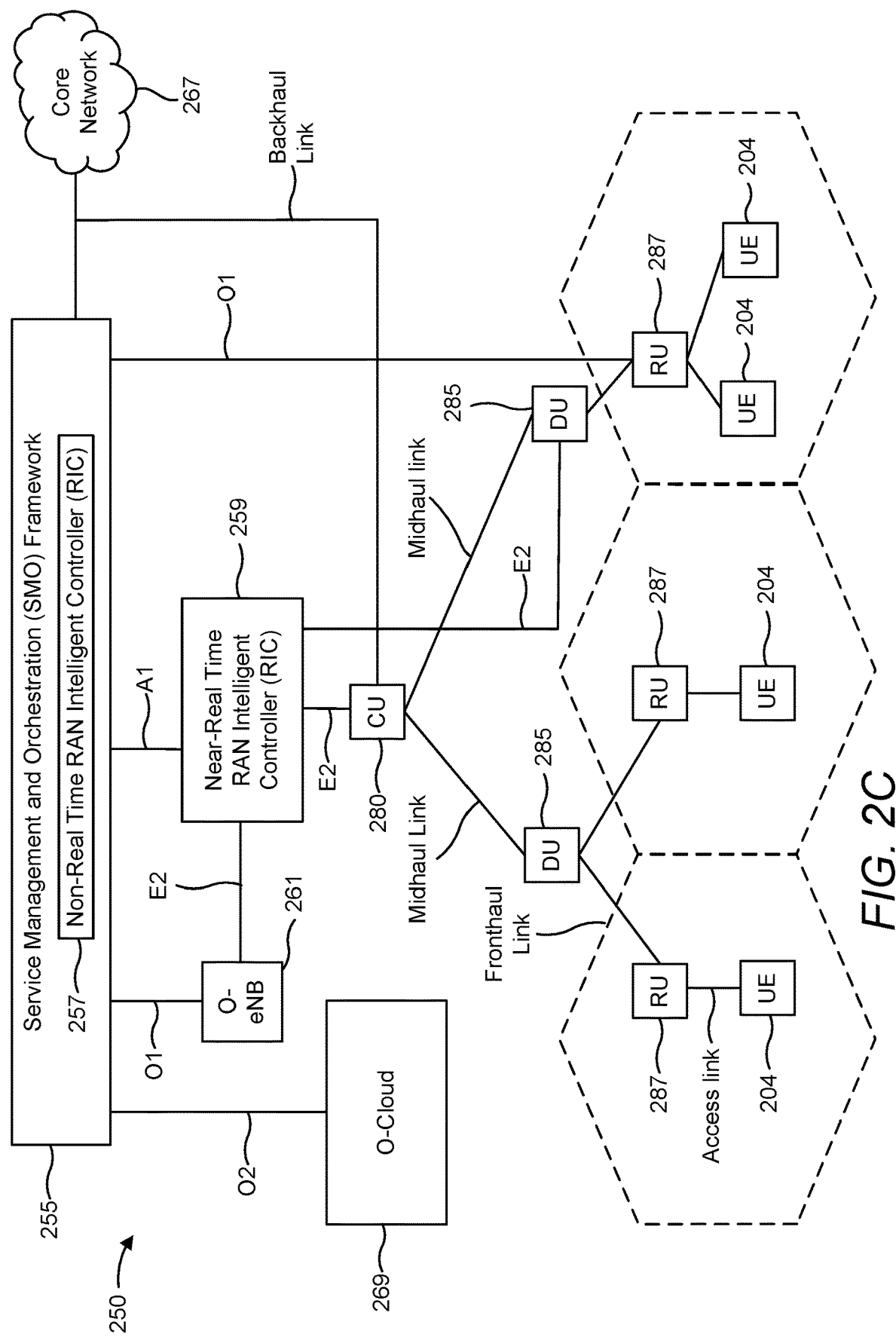

FIG. 2C is a diagram 250 illustrating an example disaggregated base station architecture, according to aspects of the disclosure. The disaggregated base station 250 architecture may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (MC) 259 via an E2 link, or a Non-Real Time (Non-RT) MC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT MC 259. The Near-RT MC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT MC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT MC 257 or the Near-RT MC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
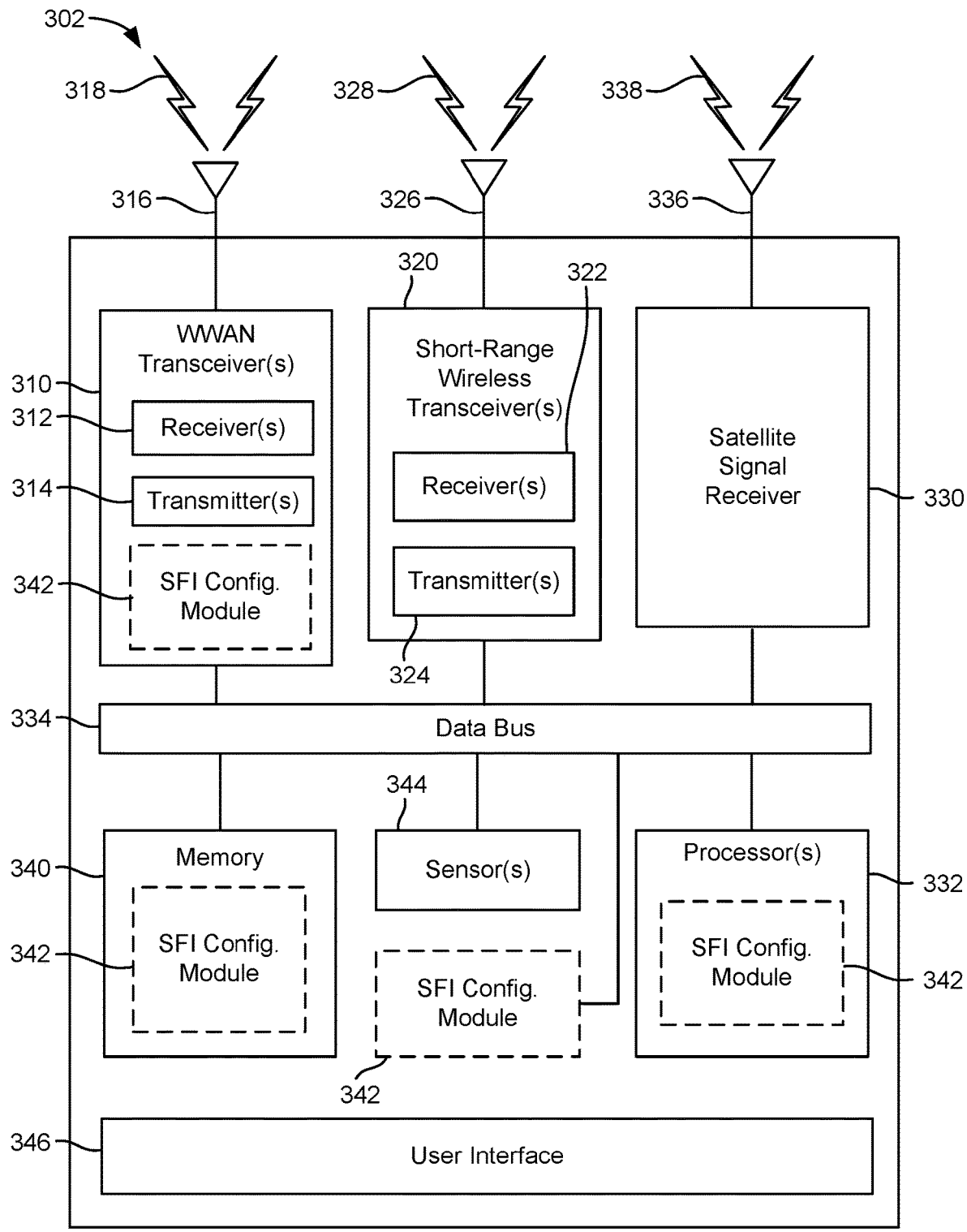
FIGS. 3A, 3B, and 3C are simplified block diagrams of several sample aspects of components that may be employed in a user equipment (UE), a base station, and a network entity, respectively, and configured to support communications as taught herein.
Figure 3B:
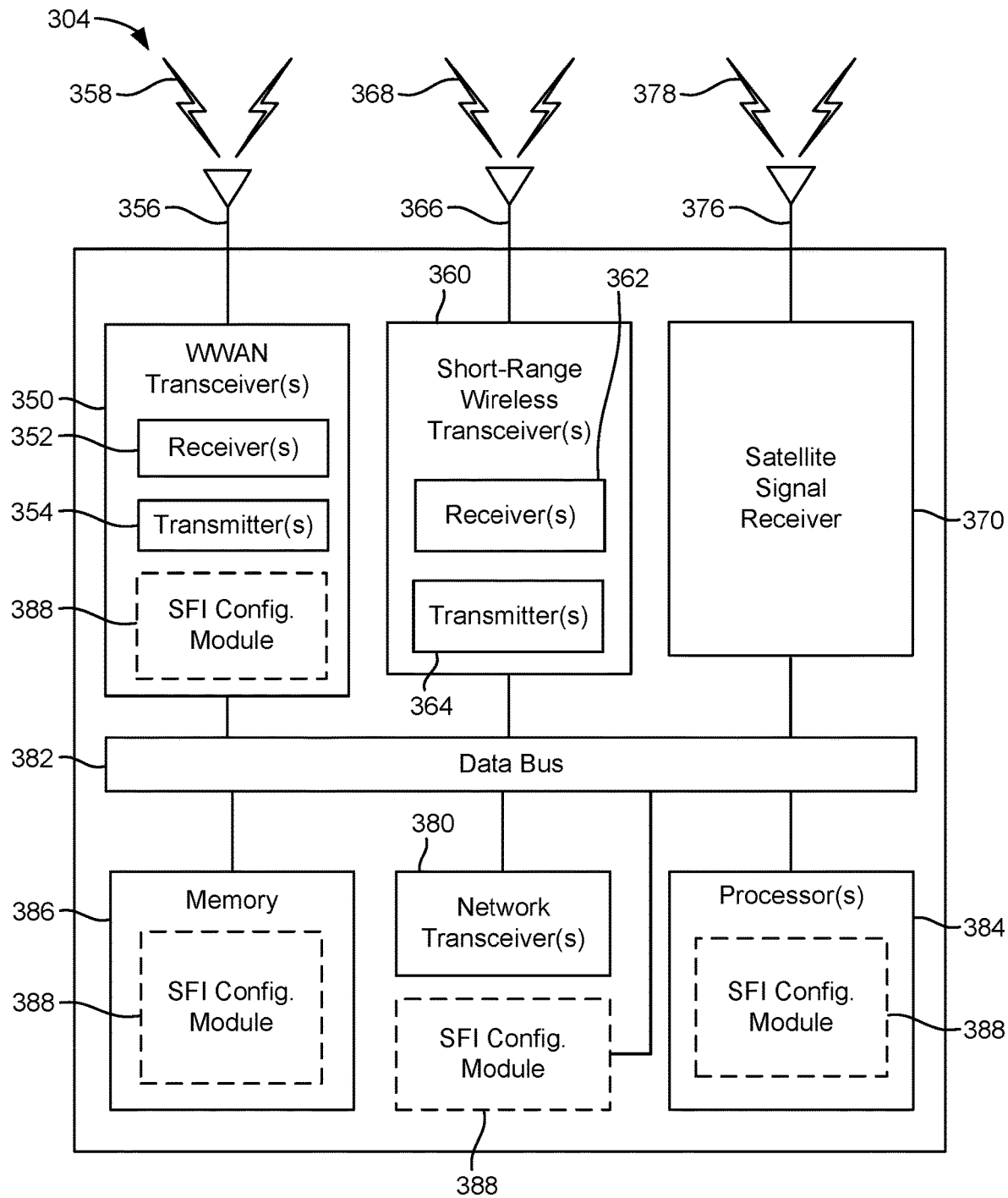
Figure 3C:
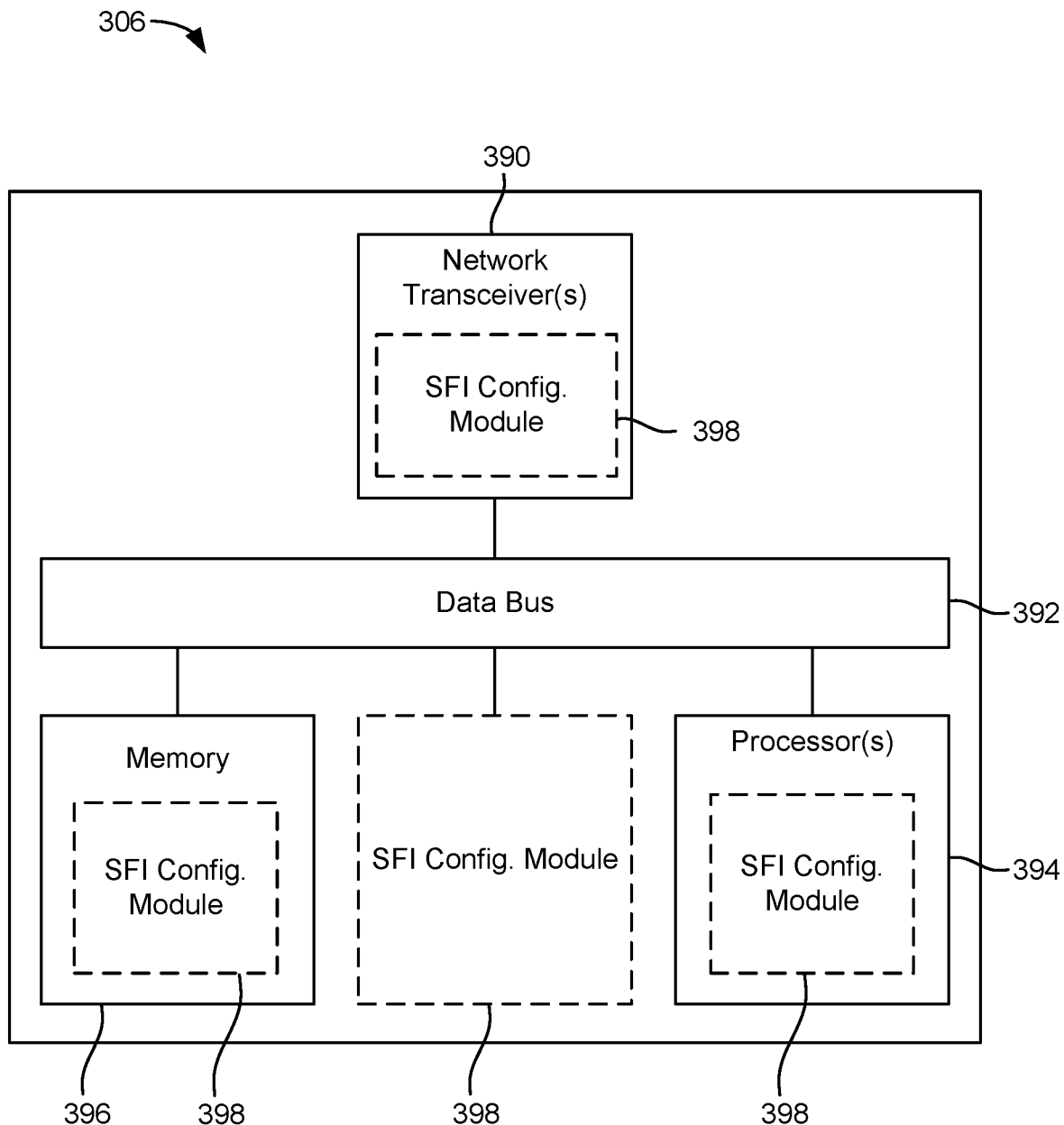

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include SFI Configuration Module 342, 388, and 398, respectively. The SFI Configuration Module 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the SFI Configuration Module 342, 388, and 398 may be external to the processors 332, 384, and 394 (e.g., part of a modem processing system, integrated with another processing system, etc.). Alternatively, the SFI Configuration Module 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the SFI Configuration Module 342, which may be, for example, part of the one or more WWAN transceivers 310, the memory 340, the one or more processors 332, or any combination thereof, or may be a standalone component. FIG. 3B illustrates possible locations of the SFI Configuration Module 388, which may be, for example, part of the one or more WWAN transceivers 350, the memory 386, the one or more processors 384, or any combination thereof, or may be a standalone component. FIG. 3C illustrates possible locations of the SFI Configuration Module 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the SFI Configuration Module 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
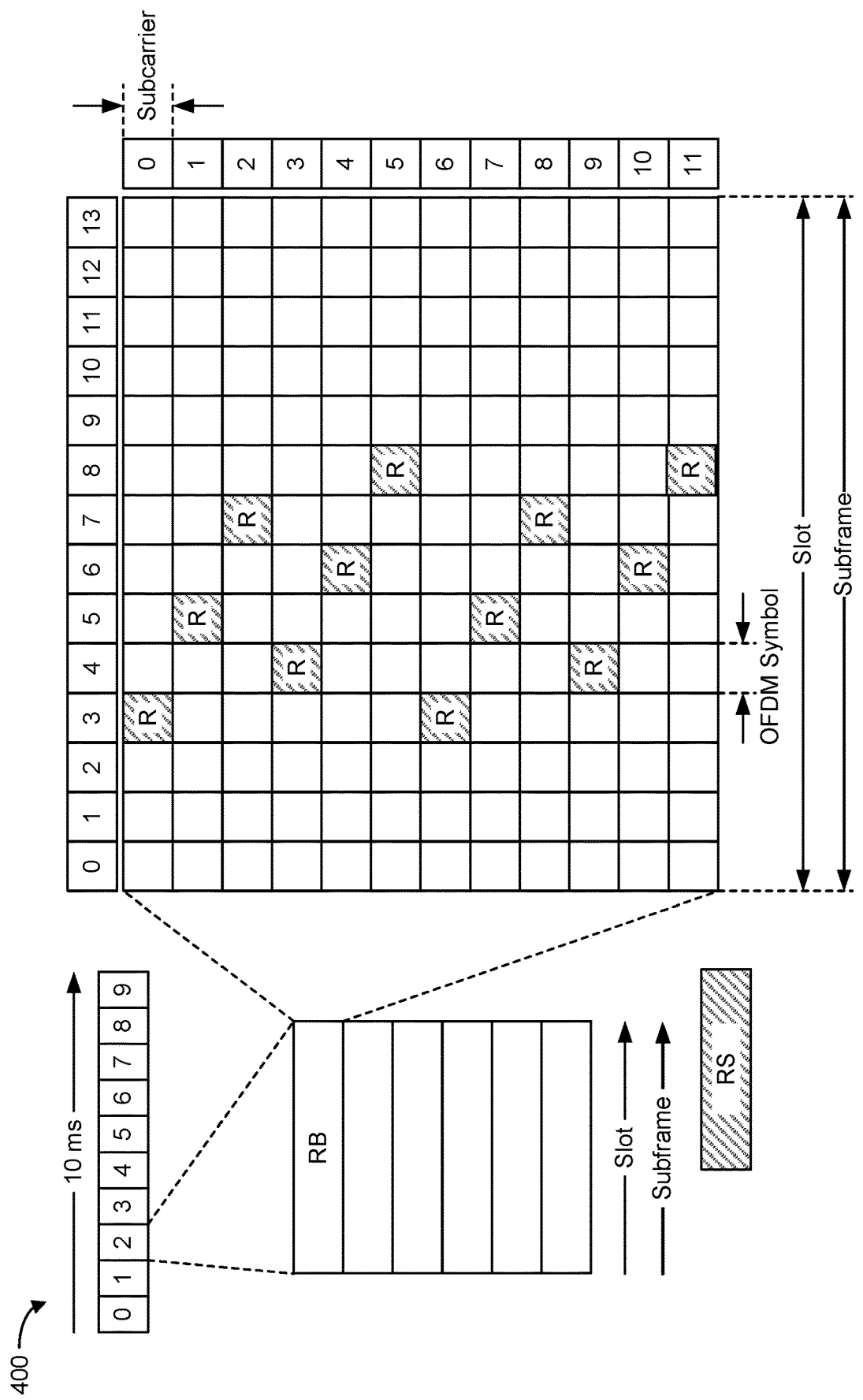
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying reference signals (labeled "R").

The following are the currently supported DCI formats. Format 0-0: fallback for scheduling of PUSCH; Format 0-1: non-fallback for scheduling of PUSCH; Format 1-0: fallback for scheduling of PDSCH; Format 1-1: non-fallback for scheduling of PDSCH; Format 2-0: notifying a group of UEs of the slot format; Format 2-1: notifying a group of UEs of the PRB(s) and OFDM symbol(s) where the UEs may assume no transmissions are intended for the UEs; Format 2-2: transmission of TPC commands for PUCCH and PUSCH; and Format 2-3: transmission of a group of SRS requests and TPC commands for SRS transmissions. Note that a fallback format is a default scheduling option that has non-configurable fields and supports basic NR operations. In contrast, a non-fallback format is flexible to accommodate NR features.

As will be appreciated, a UE needs to be able to demodulate (also referred to as "decode") the PDCCH in order to read the DCI, and thereby to obtain the scheduling of resources allocated to the UE on the PDSCH and PUSCH. If the UE fails to demodulate the PDCCH, then the UE will not know the locations of the PDSCH resources and it will keep attempting to demodulate the PDCCH using a different set of PDCCH candidates in subsequent PDCCH monitoring occasions. If the UE fails to demodulate the PDCCH after some number of attempts, the UE declares a radio link failure (RLF). To overcome PDCCH demodulation issues, search spaces are configured for efficient PDCCH detection and demodulation.

Generally, a UE does not attempt to demodulate each and very PDCCH candidate that may be scheduled in a slot. To reduce restrictions on the PDCCH scheduler, and at the same time to reduce the number of blind demodulation attempts by the UE, search spaces are configured. Search spaces are indicated by a set of contiguous CCEs that the UE is supposed to monitor for scheduling assignments/grants relating to a certain component carrier. There are two types of search spaces used for the PDCCH to control each component carrier, a common search space (CSS) and a UE-specific search space (USS).

A common search space is shared across all UEs, and a UE-specific search space is used per UE (i.e., a UE-specific search space is specific to a specific UE). For a common search space, a DCI cyclic redundancy check (CRC) is scrambled with a system information radio network temporary identifier (SI-RNTI), random access RNTI (RA-RNTI), temporary cell RNTI (TC-RNTI), paging RNTI (P-RNTI), interruption RNTI (INT-RNTI), slot format indication RNTI (SFI-RNTI), TPC-PUCCH-RNTI, TPC-PUSCH-RNTI, TPC-SRS-RNTI, cell RNTI (C-RNTI), or configured scheduling RNTI (CS-RNTI) for all common procedures. For a UE-specific search space, a DCI CRC is scrambled with a C-RNTI or CS-RNTI, as these are specifically targeted to individual UE.

A UE demodulates the PDCCH using the four UE-specific search space aggregation levels (1, 2, 4, and 8) and the two common search space aggregation levels (4 and 8). Specifically, for the UE-specific search spaces, aggregation level '1' has six PDCCH candidates per slot and a size of six CCEs. Aggregation level '2' has six PDCCH candidates per slot and a size of 12 CCEs. Aggregation level '4' has two PDCCH candidates per slot and a size of eight CCEs. Aggregation level '8' has two PDCCH candidates per slot and a size of 16 CCEs. For the common search spaces, aggregation level '4' has four PDCCH candidates per slot and a size of 16 CCEs. Aggregation level '8' has two PDCCH candidates per slot and a size of 16 CCEs. Each search space comprises a group of consecutive CCEs that could be allocated to a PDCCH, referred to as a PDCCH candidate. A UE demodulates all of the PDCCH candidates in these two search spaces (USS and CSS) to discover the DCI for that UE. For example, the UE may demodulate the DCI to obtain the scheduled uplink grant information on the PUSCH and the downlink resources on the PDSCH. Note that the aggregation level is the number of REs of a CORESET that carry a PDCCH DCI message, and is expressed in terms of CCEs. There is a one-to-one mapping between the aggregation level and the number of CCEs per aggregation level. That is, for aggregation level '4,' there are four CCEs. Thus, as shown above, if the aggregation level is '4' and the number of PDCCH candidates in a slot is '2,' then the size of the search space is '8' (i.e., 4×2=8).

In NR, SCS 120 kHz ($\mu$=3), 480 kHz ($\mu$=5) and 960 kHz ($\mu$=6) will be supported for data communications. For unpaired spectrum operation for a UE on a serving cell, the UE is provided by referencesubcarrierSpacing a reference SCS configuration $u_{SFI}$ for each slot format in a combination of slot formats indicated by a SFI-index field value in DCI format 2_0. The UE expects that for a reference SCS configuration $u_{SFI}$ and for an active DL BWP or an active UL BWP with SCS configuration u, it is $u \geq u_{SFI}$.

Each slot format in the combination of slot formats indicated by the SFI-index field value in DCI format 2_0 is applicable to $2^{(u-u_{SFI})}$ consecutive slots in the active DL BWP or the active UL BWP where the first slot starts at a same time as a first slot for the reference SCS configuration and each downlink or flexible or uplink symbol for the reference SCS configuration $2^{(u-u_{SFI})}$ corresponds to consecutive downlink or flexible or uplink symbols for the SCS configuration.

Aspects of the disclosure are directed to a reference SCS values ($u_{SFI}$) for scenarios where the active BWP SCS is 120 kHz or higher (u>3). Such aspects may provide various technical advantages, such as facilitating higher data rates while also providing flexibility with respect to switches between UL slots and DL slots.

Figure 5:
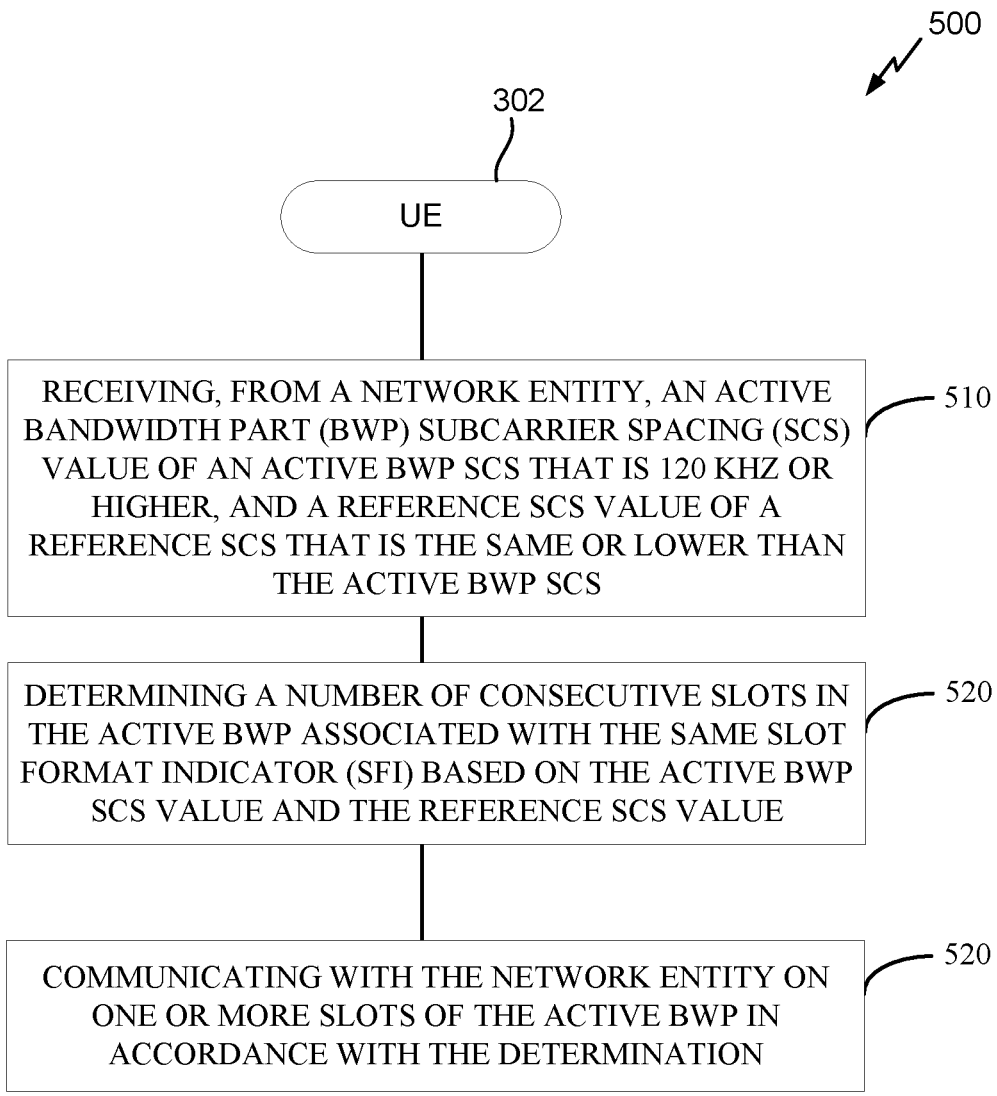
FIG. 5 illustrates an exemplary process of wireless communication, according to aspects of the disclosure.

FIG. 5 illustrates an exemplary process 500 of wireless communication, according to aspects of the disclosure. In an aspect, the process 500 may be performed by a UE, such as UE 302.

Referring to FIG. 5, at 510, UE 302 (e.g., receiver 312 or 322) receives, from a network entity (e.g., a base station such as BS 304, an O-RAN component such as RU, DU or CU, etc.), an active bandwidth part (BWP) subcarrier spacing (SCS) value of an active BWP SCS that is 120 kHz or higher, and a reference SCS value of a reference SCS that is the same or lower than the active BWP SCS. For example, the active BWP SCS value may be u (e.g., u>=3), and the reference SCS value may be $u_{SFI}$ (e.g., $u \geq u_{SFI}$).

Referring to FIG. 5, at 520, UE 302 (e.g., processor(s) 332, SFI configuration module 342, etc.) determines a number of consecutive slots in the active BWP associated with the same SFI based on the active BWP SCS value and the reference SCS value. For example, each slot format in the combination of slot formats indicated by the SFI-index field value in DCI format 2_0 is applicable to $2^{(u-u_{SFI})}$ consecutive slots in the active DL BWP or the active UL BWP where the first slot starts at a same time as a first slot for the reference SCS configuration and each downlink or flexible or uplink symbol for the reference SCS configuration $2^{(u-u_{SFI})}$ corresponds to consecutive downlink or flexible or uplink symbols for the SCS configuration.

Referring to FIG. 5, at 510, UE 302 (e.g., receiver 312 or 322, transmitter 314 or 324, etc.) communicates with the network entity on one or more slots of the active BWP in accordance with the determination.

Figure 6:
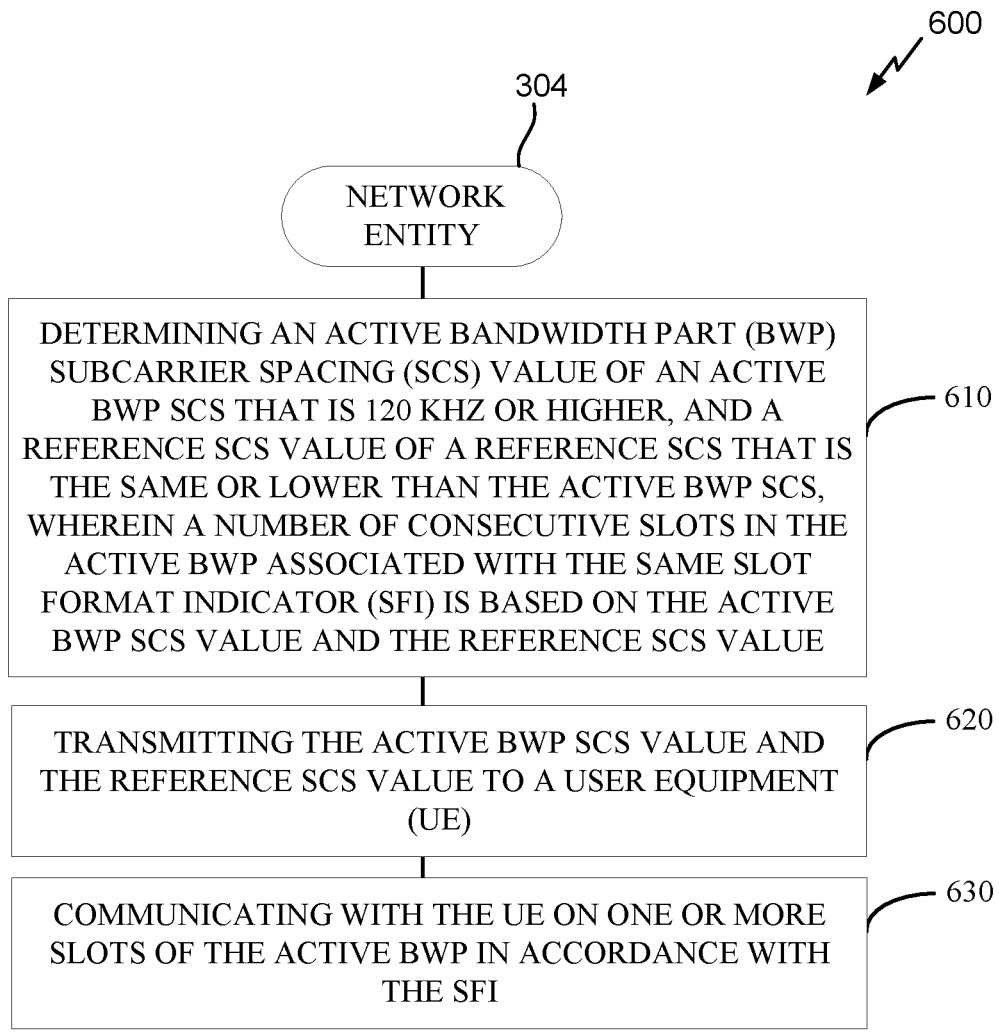
FIG. 6 illustrates an exemplary process of wireless communication, according to aspects of the disclosure.

FIG. 6 illustrates an exemplary process 600 of wireless communication, according to aspects of the disclosure. In an aspect, the process 600 may be performed by a network entity (e.g., a base station such as BS 304, an O-RAN component such as RU, DU or CU, etc.).

Referring to FIG. 6, at 610, the network entity (e.g., processor(s) 384, SFI configuration module 388, etc.) determines an active BWP SCS value of an active BWP SCS that is 120 kHz or higher, and a reference SCS value of a reference SCS that is the same or lower than the active BWP SCS, wherein a number of consecutive slots in the active BWP associated with the same SFI is based on the active BWP SCS value and the reference SCS value. For example, the active BWP SCS value may be u (e.g., u>=3), and the reference SCS value may be $u_{SFI}$ (e.g., $u \geq u_{SFI}$).

Referring to FIG. 6, at 620, the network entity (e.g., transmitter 354 or 364, etc.) transmits the active BWP SCS value and the reference SCS value to a UE.

Referring to FIG. 6, at 630, the network entity (e.g., receiver 352 or 362, transmitter 354 or 364, etc.) communicates with the UE on one or more slots of the active BWP in accordance with the SFI.

Referring to FIGS. 5-6, in some designs, the active BWP corresponds to a downlink BWP. In other designs, the active BWP corresponds to an uplink BWP.

Referring to FIGS. 5-6, in some designs, the active BWP SCS value and/or the reference SCS value are transported via DCI (e.g., DCI format 2_0).

Referring to FIGS. 5-6, in some designs, the active BWP SCS is 960 kHz or 480 kHz or 120 kHz, and the reference SCS is 480 kHz, 240 kHz, 120 kHz, or less than 120 kHz.

Referring to FIGS. 5-6, in some designs, the current range of $u_{SFI}$ (e.g., maximum value of 3) may be retained for the higher (e.g., greater than 120 kHz) active BWP SCS scenarios. For example, each 4 slots of 480 kHz corresponds to 1 slot of 120 kHz, each 8 slots of 960 kHz corresponds to 1 slot of 120 kHz, and so on). In this case, there is no change to the 3GPP Specification, but there is limited flexibility. This scenario is akin to no new ref SCS introduced though new data/control SCS introduced. As a result, the set of the reference SCS is now different from the set of data/control SCS.

Referring to FIGS. 5-6, in some designs, new values for $u_{SFI}$ (e.g., 4, 5, 6, etc.) may be introduced. In an example, u=4 is not supported for data (240 kHz), but such a configuration could be helpful in some designs to provide more flexibility without more frequent switching between UL and DL slots. In an example, each set of 2 slots of 480 kHz corresponds to 1 slot of 240 kHz, and each set of 4 slots of 960 kHz corresponds to 1 slot of 240 kHz A SFI-index field value in a DCI format 2_0 indicates to a UE a slot format for each slot in a number of slots for each DL BWP or each UL BWP starting from a slot where the UE detects the DCI format 2_0. The number of slots is equal to or larger than a PDCCH monitoring periodicity for DCI format 2_0.

The SFI-index field includes bits where maxSFIindex is the maximum value of the values provided by corresponding slotFormatCombinationId. In an example, a slot format is identified by a corresponding format index as provided in a Table 11.1.1-1 [TS 38.213] where 'D' denotes a downlink symbol, 'U' denotes an uplink symbol, and 'F' denotes a flexible symbol. If increase $u_{SFI}$ is increased, and since the monitoring periodicity is expected to increase as well for SCS 480 kHz and 960 kHz, the size of RRC table will be increased as well. Therefore, the configuration overhead will be increased.

Aspects of the disclosures are thereby directed to an indication of a SFI configuration for a plurality of slots with varying SFIs (e.g., instead of per-slot or slot-specific SFIs, or multi-slot SFI configurations with a fixed SFI). Such aspects may facilitate various technical advantages, such as reducing configuration overhead associated with multi-slot SFI configurations, particularly at higher SCSs (e.g., 480 kHz, 960 kHz, etc.).

Figure 7:
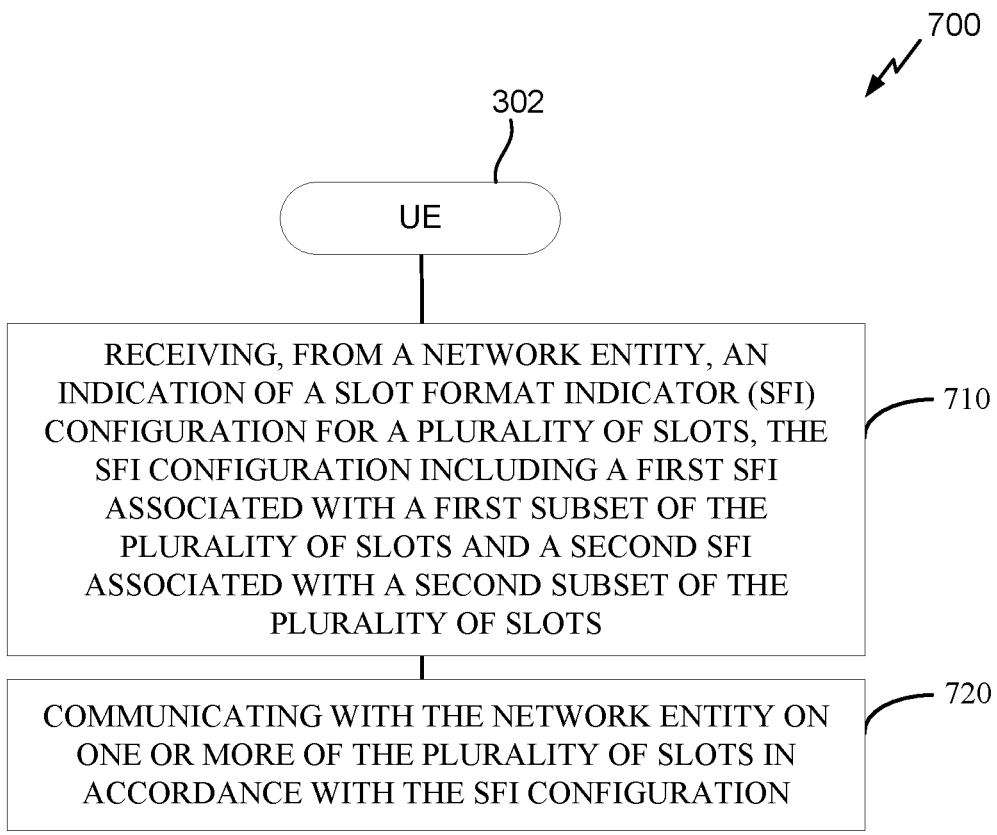
FIG. 7 illustrates an exemplary process of wireless communication, according to aspects of the disclosure.

FIG. 7 illustrates an exemplary process 700 of wireless communication, according to aspects of the disclosure. In an aspect, the process 700 may be performed by a UE, such as UE 302.

Referring to FIG. 7, at 710, UE 302 (e.g., receiver 312 or 322) receives, from a network entity (e.g., a base station such as BS 304, an O-RAN component such as RU, DU or CU, etc.), an indication of a SFI configuration for a plurality of slots, the SFI configuration including a first SFI associated with a first subset of the plurality of slots and a second SFI associated with a second subset of the plurality of slots.

Figure 8:
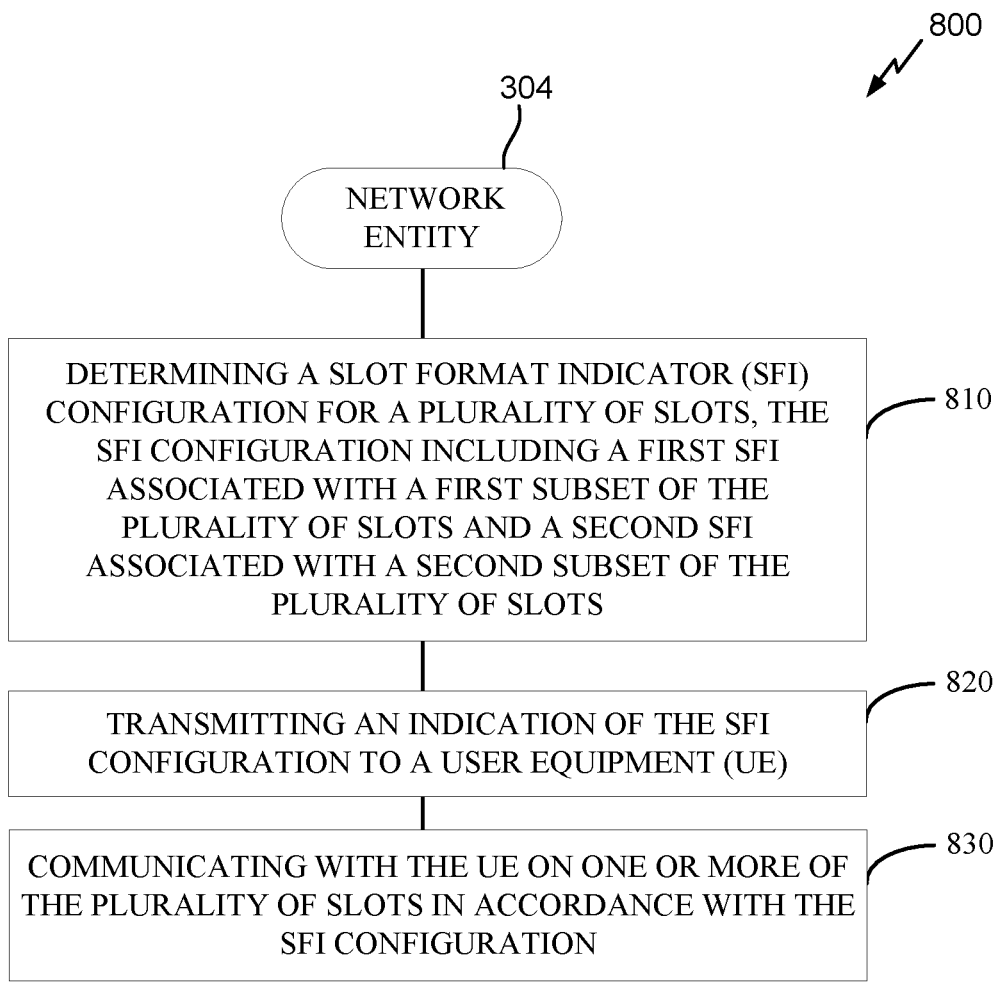
FIG. 8 illustrates an exemplary process of wireless communication, according to aspects of the disclosure.

Referring to FIG. 7, at 720, UE 302 (e.g., receiver 312 or 322, transmitter 314 or 324, etc.) communicates with the network entity on one or more of the plurality of slots in accordance with the SFI configuration FIG. 8 illustrates an exemplary process 800 of wireless communication, according to aspects of the disclosure. In an aspect, the process 800 may be performed by a network entity (e.g., a base station such as BS 304, an O-RAN component such as RU, DU or CU, etc.).

Referring to FIG. 8, at 810, the network entity (e.g., SFI configuration module 388, processor(s) 384, etc.) determines a slot format indicator (SFI) configuration for a plurality of slots, the SFI configuration including a first SFI associated with a first subset of the plurality of slots and a second SFI associated with a second subset of the plurality of slots.

Referring to FIG. 8, at 820, the network entity (e.g., transmitter 354 or 364, etc.) transmits an indication of the SFI configuration to a UE.

Referring to FIG. 8, at 830, the network entity (e.g., receiver 352 or 362, transmitter 354 or 364, etc.) communicates with the UE on one or more of the plurality of slots in accordance with the SFI configuration.

Referring to FIGS. 7-8, in some designs, the plurality of slots includes at least each slot between two consecutive PDCCH occasions. In some designs, the indication of the SFI configuration at 710 or 820 is transported via DCI. In this, the multi-slot SFI configuration may function as an RRC configuration saving feature, so that when the gNB configures the UE-specific SFI table, either less bytes are used, or for the same number of bytes, more formats across multiple slots can be configured. Note that the number of slots in a row of a respective SFI format (e.g., such as those depicted in Table 11.1.1-1 [TS 38.213]) can be larger than the PDCCH monitoring period, so repetitions of a row may not occur before the next monitoring occasion (e.g., rather, smaller SFI patterns may be specified so as to facilitate repetition while reducing the configuration overhead).

FIG. 9 illustrates various SFI configurations across slots 0 . . . 7 in accordance with aspects of the disclosure. At 910, a legacy SFI configuration is depicted, where the SFI for each slot is configured individually (i.e., high configuration overhead).

Referring to FIGS. 7-8, in some designs, the first SFI is associated with a first slot repetition factor, and the SFI is associated with a second slot repetition factor. The first and second slot repetition factors may be the same or different. For example, for a slot format of 4 slots (e.g., the SFI pattern for these 4 slots will repeat) and a repetition factor of 2 (e.g., each slot in the SFI pattern repeats 2 times) can be indicated to fill 8 slots. This aspect in depicted 920 of FIG. 9, where SFI pattern [1, 2, 3, 4] repeats twice across slots 0 . . . 7. If repetition factor of 3 (e.g., for each slot in the SFI pattern) is indicated, the row will control the format of 12 entries. Hence, the SFI configuration designates an SFI slot pattern comprising the first and second SFIs that repeats at least partially across the plurality of slots. In some designs, it is possible for an SFI pattern to repeat only partially (e.g., if the next PDCCH monitoring occasion is reached before the SFI pattern repeats in full). For example, in SFI pattern 920, M slots may be configured, with the M slot configuration repeated to cover the PDCCH monitoring periodicity N. In this case, the size of each row to PDCCH monitoring periodicity can be limited (e.g., since only the M slots need to be defined, instead of all slots between PDCCH monitoring occasions). Also, in this case, a repetition factor need not be separately configured, since it is determined by CEIL(N/M).

Referring to FIGS. 7-8, in some designs, individual slots associated with each SFI may be interleaved with individual slots associated with each other SFI. In other designs, the SFI configuration may include a first contiguous group of slots including all of the first subset of slots associated with the first SFI, followed by a second contiguous group of slots including all of the second subset of slots associated with the second SFI. This aspect is depicted in SFI pattern 930 of FIG. 9 (e.g., slots 0-1 correspond to a group of slots with SFI 1, slots 2-3 correspond to a group of slots with SFI 2, etc.). In some designs, as shown with respect to SFI pattern 930 of FIG. 9, a first number of slots among the first contiguous group of slots is the same as a second number of slots among the second contiguous group of slots. In other designs, as shown in SFI pattern 950 of FIG. 9) a first number of slots among each first contiguous group of slots is different than a second number of slots among each second contiguous group of slots (e.g., slots 0-1 correspond to a group of two slots with SFI 1, slots 2-4 correspond to a group of three slots with SFI 2, etc.).

Referring to FIGS. 7-8, in some designs, the SFI configuration includes first contiguous groups of slots associated with the first SFI that are interleaved with second contiguous groups of slots associated with the second SFI. This aspects is depicted in SFI pattern 940 of FIG. 9, whereby groups of SFI 1 slots are interleaved with groups of SFI 2 slots. As shown in SFI pattern 940, a first number of slots among the first contiguous group of slots may be the same as a second number of slots among the second contiguous group of slots. However, in other designs, a first number of slots among each first contiguous group of slots is different than a second number of slots among each second contiguous group of slots. In other words, while not depicted in FIG. 9, contiguous groups of slots interleaved in this manner need not include the same number of slots per group.

Referring to FIGS. 7-8, in some designs, upon reaching a respective slot repetition factor for a respective SFI, the respective SFI is removed from the SFI slot pattern for any subsequent repetitions of the SFI slot pattern. SFI pattern 960 of FIG. 9 is a variation of SFI pattern 920 whereby the SFIs are associated with different repetition factors. In particular, SFI 1 is associated with a repetition factor of 2, SFI 2 is associated with a repetition factor of 3, SFI 3 is associated with a repetition factor of 2, and SFI 4 is associated with a repetition factor of 1. As can be seen, SFIs are removed in the SFI pattern 960 once their repetition factor is reached.

Referring to FIG. 9, with respect to SFI patterns 930 and 950-960, a slot can be configured with SFI, and a repetition factor can be configured per slot. In case of SFI pattern 930, repetition can be applied sequentially in time, for example, first and third slot format is repeated twice, second slot format to be repeated 3 times, no repetition for fourth slot format. In case of SFI pattern 950, a single repetition to be applied on slot-based fashion. In case of SFI pattern 960, several sequences are formed based on number of repetitions, sequences are applied sequentially in time. Generally, SFI patterns 930 and 950-960 permit more flexibility than SFI patterns 920 and 940, but are also associated with more configuration overhead.

Referring to FIGS. 7-8, in some designs, the SFI configuration is transported via DCI (e.g., DCI format 2_0). For example, the SFI configuration may be included in DCI format 2_0 which designates a particular row (or pattern) in a corresponding SFI pattern table. In some designs, the multi-slot configuration in FIGS. 7-8 may permit more flexibility compared with using smaller $u_{SFI}$ as the SFI of any two adjacent slots could be different.

Referring to FIGS. 7-8, in some designs, the UE is preconfigured with a plurality of SFI configuration options for the plurality of slots, and the indication of the SFI configuration at 710 or 820 is based on an indication of one of the plurality of SFI configuration options. Referring to FIGS. 7-8, in some designs, the indication of the SFI configuration at 710 or 820 includes a number of SFIs included in the SFI configuration, and the SFI configuration is determined based on the number of SFIs and a pre-defined SFI-to-slot mapping rule. In some designs, the pre-defined SFI-to-slot mapping rule divides the plurality of slots by the indicated number of SFIs to obtain a plurality of contiguous groups of slots, and assigns one of the plurality of contiguous groups to each of a plurality of SFIs, an example of which is depicted in FIG. 10.

Figure 10:
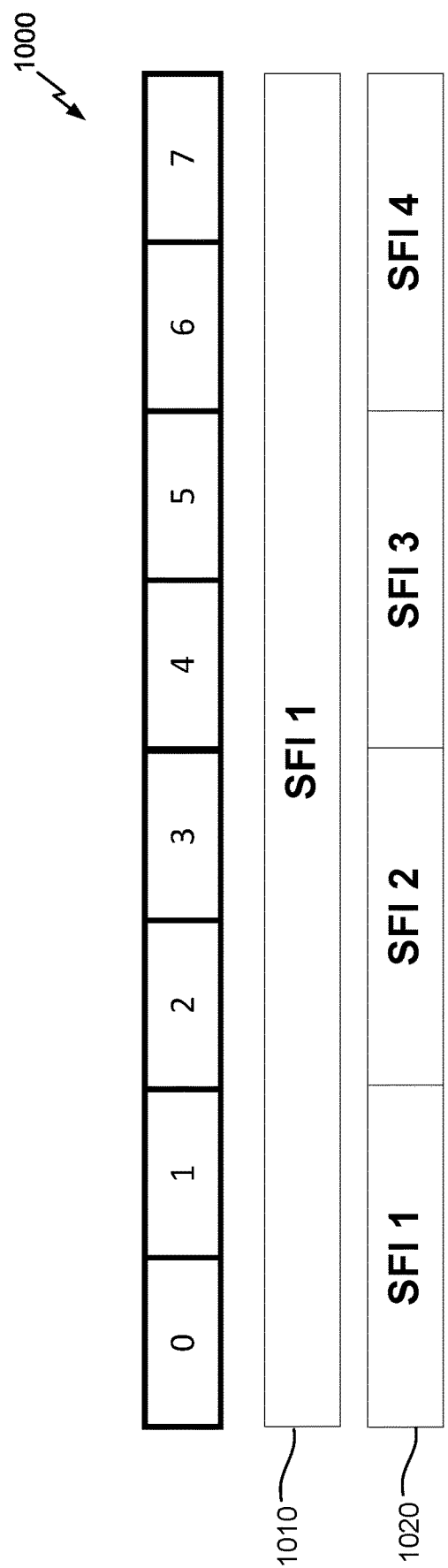
FIG. 10 illustrates multi-slot SFI configurations across slots 0 . . . 7 in accordance with aspects of the disclosure.

FIG. 10 illustrates multi-slot SFI configurations across slots 0 . . . 7 in accordance with aspects of the disclosure. At 1010, a legacy multi-slot SFI configuration is depicted, where the same SFI (i.e., SFI 1) is maintained across slots 0 . . . 7 (e.g., low configuration overhead, but limited SFI flexibility). At 1020, a multi-slot SFI configuration whereby SFI 1 is allocated to slots 0-1, SFI 2 is allocated to slots 2-3, SFI 3 is allocated to slots 4-5, and SFI 4 is allocated to slots 6-7. As noted above, in some designs, the network entity may indicate that four (4) SFIs are associated with slots 0 . . . 7, and UE 302 may then split these slots evenly in accordance with a pre-defined SFI order so as to distribute the SFIs to slots as depicted at 1020.

Referring to FIG. 10, in some designs, an M>1 SFI field may be introduced in the DCI 2_0, and each SFI reads from the same table, and corresponds to certain number of slots (variable), and the slot formats from different SFIs are applied sequentially. For example, assume the UE is configured to monitor PDCCH every 8 slots. In legacy operation, a single SFI (SFI 1) would be defined for the 8 slots (slots 0 . . . 7), and only one SFI is signaled. In FIG. 10 by contrast, an indication of four (4) SFIs may be signaled, and which implicitly signals multiple SFIs per DCI to be applied sequentially in time.

Referring to FIGS. 7-8, in some designs, the indicated number of SFIs is UE-specific. For example, gNB may configure a UE about the value M, so M is transparent to other UEs, and different UE in a group may have individual Ms.

Referring to FIGS. 7-8, in some designs, the number of bits for a UE in DCI 2_0 may be fixed (e.g., so each UE in the group always uses a same positionInDCI to retrieve its own SFI indexes). However, in some designs, it is still preferrable for gNB to carry less than M SFI index. For example, gNB may carry 1 valid SFI index while it may carry up to M valid SFI indexes. Hence, in some designs, the indication is transported in association with fewer SFI indexes than the number of SFIs. This can be accomplished in a variety of ways.

For example, one or more SFI index fields are configured via radio resource control (RRC) configuration with reserved or invalid entries that are not associated with a respective SFI.

In a specific example, assume gNB has RRC configured $2^N$ entries in SlotFormatComb table, such that N bits are required for each SFI index. In this case, gNB may carry m (m<=M) valid SFI indexes in DCI 2_0. In one example, the first m SFI index are configured as pointing to valid entries in SlotFormatComb, for rest of (M−m) SFI index, assign value so that they point to some "reserved/invalid" entry in SlotFormatComb table.

In another example, the number of SFIs is indicated via a field in a DCI. In some designs, the number of SFIs is indicated via a bitmap that indicates whether a respective SFI index is valid, or the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

In a specific example, a number of SFIs per DCI can be signaled in the DCI in a separate filed in the DCI. In one example, up to M SFI indexes may be carried, with M*(N+1) bits allocated for the UE in DCI 2_0. One bit of each M bits uses 0/1 to indicate if the corresponding SFI index is valid or not. In another example, CEIL(log 2(M)) bits are allocated in the DCI to signal number of valid SFIs, i.e., total size M*N+CEIL(log 2(M)). If value u is signaled in the new field, then the first u+1 SFI fields are valid. For example, DCI is configured with 4 SFIs fields, and number of active SFIs is set to be 3, then the last SFI field will be ignored by UE.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: receiving, from a network entity, an active bandwidth part (BWP) subcarrier spacing (SCS) value of an active BWP SCS that is 120 kHz or higher, and a reference SCS value of a reference SCS that is the same or lower than the active BWP SCS; determining a number of consecutive slots in the active BWP associated with the same slot format indicator (SFI) based on the active BWP SCS value and the reference SCS value; communicating with the network entity on one or more slots of the active BWP in accordance with the determination.

Clause 2. The method of clause 1, wherein the active BWP corresponds to a downlink BWP.

Clause 3. The method of any of clauses 1 to 2, wherein the active BWP corresponds to an uplink BWP.

Clause 4. The method of any of clauses 1 to 3, wherein the active BWP SCS value is received via downlink control information (DCI).

Clause 5. The method of any of clauses 1 to 4, wherein the reference SCS value is received via downlink control information (DCI).

Clause 6. The method of any of clauses 1 to 5, wherein the active BWP SCS is 960 kHz or 480 kHz or 120 kHz, and wherein the reference SCS is 480 kHz, 240 kHz, 120 kHz, or less than 120 kHz.

Clause 7. The method of any of clauses 1 to 6, wherein the reference SCS value has a maximum of three.

Clause 8. The method of any of clauses 1 to 7, wherein reference SCS value is greater than three.

Clause 9. A method of operating a network entity, comprising: determining an active bandwidth part (BWP) subcarrier spacing (SCS) value of an active BWP SCS that is 120 kHz or higher, and a reference SCS value of a reference SCS that is the same or lower than the active BWP SCS, wherein a number of consecutive slots in the active BWP associated with the same slot format indicator (SFI) is based on the active BWP SCS value and the reference SCS value; transmitting the active BWP SCS value and the reference SCS value to a user equipment (UE); and communicating with the UE on one or more slots of the active BWP in accordance with the SFI.

Clause 10. The method of clause 9, wherein the active BWP corresponds to a downlink BWP.

Clause 11. The method of any of clauses 9 to 10, wherein the active BWP corresponds to an uplink BWP.

Clause 12. The method of any of clauses 9 to 11, wherein the active BWP SCS value is transmitted via downlink control information (DCI).

Clause 13. The method of any of clauses 9 to 12, wherein the reference SCS value is transmitted via downlink control information (DCI).

Clause 14. The method of clause 13, wherein the active BWP SCS is 960 kHz or 480 kHz or 120 kHz, and wherein the reference SCS is 480 kHz, 240 kHz, 120 kHz, or less than 120 kHz.

Clause 15. The method of any of clauses 9 to 14, wherein the reference SCS value has a maximum of three.

Clause 16. The method of any of clauses 9 to 15, wherein reference SCS value is greater than three.

Clause 17. A method of operating a user equipment (UE), comprising: receiving, from a network entity, an indication of a slot format indicator (SFI) configuration for a plurality of slots, the SFI configuration including a first SFI associated with a first subset of the plurality of slots and a second SFI associated with a second subset of the plurality of slots; and communicating with the network entity on one or more of the plurality of slots in accordance with the SFI configuration.

Clause 18. The method of clause 17, wherein the plurality of slots includes at least each slot between two consecutive physical downlink control channel (PDCCH) occasions.

Clause 19. The method of any of clauses 17 to 18, wherein the first SFI is associated with a first slot repetition factor, and wherein the SFI is associated with a second slot repetition factor.

Clause 20. The method of clause 19, wherein the first and second slot repetition factors are the same.

Clause 21. The method of any of clauses 19 to 20, wherein the first and second slot repetition factors are different.

Clause 22. The method of any of clauses 19 to 21, wherein the SFI configuration designates an SFI slot pattern comprising the first and second SFIs that repeats at least partially across the plurality of slots.

Clause 23. The method of clause 22, wherein, upon reaching a respective slot repetition factor for a respective SFI, the respective SFI is removed from the SFI slot pattern for any subsequent repetitions of the SFI slot pattern.

Clause 24. The method of any of clauses 19 to 23, wherein individual slots associated with the first SFI are interleaved with individual slots associated with the second SFI.

Clause 25. The method of any of clauses 19 to 24, wherein the SFI configuration includes a first contiguous group of slots including all of the first subset of slots associated with the first SFI, followed by a second contiguous group of slots including all of the second subset of slots associated with the second SFI.

Clause 26. The method of clause 25, wherein a first number of slots among the first contiguous group of slots is the same as a second number of slots among the second contiguous group of slots.

Clause 27. The method of any of clauses 25 to 26, wherein a first number of slots among each first contiguous group of slots is different than a second number of slots among each second contiguous group of slots.

Clause 28. The method of any of clauses 19 to 27, wherein the SFI configuration includes first contiguous groups of slots associated with the first SFI that are interleaved with second contiguous groups of slots associated with the second SFI.

Clause 29. The method of clause 28, wherein a first number of slots among each first contiguous group of slots is the same as a second number of slots among each second contiguous group of slots.

Clause 30. The method of any of clauses 28 to 29, wherein a first number of slots among each first contiguous group of slots is different than a second number of slots among each second contiguous group of slots.

Clause 31. The method of any of clauses 17 to 30, wherein the SFI configuration is received via downlink control information (DCI).

Clause 32. The method of any of clauses 17 to 31, wherein the UE is preconfigured with a plurality of SFI configuration options for the plurality of slots, and wherein the receiving receives an indication of one of the plurality of SFI configuration options.

Clause 33. The method of any of clauses 17 to 32, wherein the indication comprises a number of SFIs included in the SFI configuration, and wherein the SFI configuration is determined based on the number of SFIs and a pre-defined SFI-to-slot mapping rule.

Clause 34. The method of clause 33, wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs.

Clause 35. The method of any of clauses 33 to 34, wherein the indicated number of SFIs is UE-specific.

Clause 36. The method of any of clauses 33 to 35, wherein the indication is received in association with fewer SFI indexes than the number of SFIs.

Clause 37. The method of clause 36, wherein one or more SFI index fields are configured via radio resource control (RRC) configuration with reserved or invalid entries that are not associated with a respective SFI.

Clause 38. The method of any of clauses 36 to 37, wherein the number of SFIs is indicated via a field in a downlink control information (DCI).

Clause 39. The method of clause 38, wherein the number of SFIs is indicated via a bitmap that indicates whether a respective SFI index is valid, or wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Clause 40. A method of operating a network entity, comprising: determining a slot format indicator (SFI) configuration for a plurality of slots, the SFI configuration including a first SFI associated with a first subset of the plurality of slots and a second SFI associated with a second subset of the plurality of slots; transmitting an indication of the SFI configuration to a user equipment (UE); and communicating with the UE on one or more of the plurality of slots in accordance with the SFI configuration.

Clause 41. The method of clause 40, wherein the plurality of slots includes at least each slot between two consecutive physical downlink control channel (PDCCH) occasions.

Clause 42. The method of any of clauses 40 to 41, wherein the first SFI is associated with a first slot repetition factor, and wherein the SFI is associated with a second slot repetition factor.

Clause 43. The method of clause 42, wherein the first and second slot repetition factors are the same.

Clause 44. The method of any of clauses 42 to 43, wherein the first and second slot repetition factors are different.

Clause 45. The method of any of clauses 42 to 44, wherein the SFI configuration designates an SFI slot pattern comprising the first and second SFIs that repeats at least partially across the plurality of slots.

Clause 46. The method of clause 45, wherein, upon reaching a respective slot repetition factor for a respective SFI, the respective SFI is removed from the SFI slot pattern for any subsequent repetitions of the SFI slot pattern.

Clause 47. The method of any of clauses 42 to 46, wherein individual slots associated with the first SFI are interleaved with individual slots associated with the second SFI.

Clause 48. The method of any of clauses 42 to 47, wherein the SFI configuration includes a first contiguous group of slots including all of the first subset of slots associated with the first SFI, followed by a second contiguous group of slots including all of the second subset of slots associated with the second SFI.

Clause 49. The method of clause 48, wherein a first number of slots among the first contiguous group of slots is the same as a second number of slots among the second contiguous group of slots.

Clause 50. The method of any of clauses 48 to 49, wherein a first number of slots among each first contiguous group of slots is different than a second number of slots among each second contiguous group of slots.

Clause 51. The method of any of clauses 42 to 50, wherein the SFI configuration includes first contiguous groups of slots associated with the first SFI that are interleaved with second contiguous groups of slots associated with the second SFI.

Clause 52. The method of clause 51, wherein a first number of slots among each first contiguous group of slots is the same as a second number of slots among each second contiguous group of slots.

Clause 53. The method of any of clauses 51 to 52, wherein a first number of slots among each first contiguous group of slots is different than a second number of slots among each second contiguous group of slots.

Clause 54. The method of any of clauses 40 to 53, wherein the SFI configuration is transmitted via downlink control information (DCI).

Clause 55. The method of any of clauses 40 to 54, wherein the UE is preconfigured with a plurality of SFI configuration options for the plurality of slots, and wherein the transmitting transmits an indication of one of the plurality of SFI configuration options.

Clause 56. The method of any of clauses 40 to 55, wherein the indication comprises a number of SFIs included in the SFI configuration, and wherein the SFI configuration is determined based on the number of SFIs and a pre-defined SFI-to-slot mapping rule.

Clause 57. The method of clause 56, wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs.

Clause 58. The method of any of clauses 56 to 57, wherein the indicated number of SFIs is UE-specific.

Clause 59. The method of any of clauses 56 to 58, wherein the indication is transmitted in association with fewer SFI indexes than the number of SFIs.

Clause 60. The method of clause 59, wherein one or more SFI index fields are configured via radio resource control (RRC) configuration with reserved or invalid entries that are not associated with a respective SFI.

Clause 61. The method of any of clauses 59 to 60, wherein the number of SFIs is indicated via a field in a downlink control information (DCI).

Clause 62. The method of clause 61, wherein the number of SFIs is indicated via a bitmap that indicates whether a respective SFI index is valid, or wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Clause 63. A user equipment (UE), comprising: a memory; at least one transceiver; and at least one processor communicatively coupled to the memory and the at least one transceiver, the at least one processor configured to: receive, via the at least one transceiver, from a network entity, an active bandwidth part (BWP) subcarrier spacing (SCS) value of an active BWP SCS that is 120 kHz or higher, and a reference SCS value of a reference SCS that is the same or lower than the active BWP SCS; determine a number of consecutive slots in the active BWP associated with the same slot format indicator (SFI) based on the active BWP SCS value and the reference SCS value; communicate, via the at least one transceiver, with the network entity on one or more slots of the active BWP in accordance with the determination.

Clause 64. The UE of clause 63, wherein the active BWP corresponds to a downlink BWP.

Clause 65. The UE of any of clauses 63 to 64, wherein the active BWP corresponds to an uplink BWP.

Clause 66. The UE of any of clauses 63 to 65, wherein the active BWP SCS value is received via downlink control information (DCI).

Clause 67. The UE of any of clauses 63 to 66, wherein the reference SCS value is received via downlink control information (DCI).

Clause 68. The UE of any of clauses 63 to 67, wherein the active BWP SCS is 960 kHz or 480 kHz or 120 kHz, and wherein the reference SCS is 480 kHz, 240 kHz, 120 kHz, or less than 120 kHz.

Clause 69. The UE of any of clauses 63 to 68, wherein the reference SCS value has a maximum of three.

Clause 70. The UE of any of clauses 63 to 69, wherein reference SCS value is greater than three.

Clause 71. A network entity, comprising: a memory; at least one transceiver; and at least one processor communicatively coupled to the memory and the at least one transceiver, the at least one processor configured to: determine an active bandwidth part (BWP) subcarrier spacing (SCS) value of an active BWP SCS that is 120 kHz or higher, and a reference SCS value of a reference SCS that is the same or lower than the active BWP SCS, wherein a number of consecutive slots in the active BWP associated with the same slot format indicator (SFI) is based on the active BWP SCS value and the reference SCS value; transmit, via the at least one transceiver, the active BWP SCS value and the reference SCS value to a user equipment (UE); and communicate, via the at least one transceiver, with the UE on one or more slots of the active BWP in accordance with the SFI.

Clause 72. The network entity of clause 71, wherein the active BWP corresponds to a downlink BWP.

Clause 73. The network entity of any of clauses 71 to 72, wherein the active BWP corresponds to an uplink BWP.

Clause 74. The network entity of any of clauses 71 to 73, wherein the active BWP SCS value is transmitted via downlink control information (DCI).

Clause 75. The network entity of any of clauses 71 to 74, wherein the reference SCS value is transmitted via downlink control information (DCI).

Clause 76. The network entity of clause 75, wherein the active BWP SCS is 960 kHz or 480 kHz or 120 kHz, and wherein the reference SCS is 480 kHz, 240 kHz, 120 kHz, or less than 120 kHz.

Clause 77. The network entity of any of clauses 71 to 76, wherein the reference SCS value has a maximum of three.

Clause 78. The network entity of any of clauses 71 to 77, wherein reference SCS value is greater than three.

Clause 79. A UE, comprising: a memory; at least one transceiver; and at least one processor communicatively coupled to the memory and the at least one transceiver, the at least one processor configured to: receive, via the at least one transceiver, from a network entity, an indication of a slot format indicator (SFI) configuration for a plurality of slots, the SFI configuration including a first SFI associated with a first subset of the plurality of slots and a second SFI associated with a second subset of the plurality of slots; and communicate, via the at least one transceiver, with the network entity on one or more of the plurality of slots in accordance with the SFI configuration.

Clause 80. The UE of clause 79, wherein the plurality of slots includes at least each slot between two consecutive physical downlink control channel (PDCCH) occasions.

Clause 81. The UE of any of clauses 79 to 80, wherein the first SFI is associated with a first slot repetition factor, and wherein the SFI is associated with a second slot repetition factor.

Clause 82. The UE of clause 81, wherein the first and second slot repetition factors are the same.

Clause 83. The UE of any of clauses 81 to 82, wherein the first and second slot repetition factors are different.

Clause 84. The UE of any of clauses 81 to 83, wherein the SFI configuration designates an SFI slot pattern comprising the first and second SFIs that repeats at least partially across the plurality of slots.

Clause 85. The UE of clause 84, wherein, upon reaching a respective slot repetition factor for a respective SFI, the respective SFI is removed from the SFI slot pattern for any subsequent repetitions of the SFI slot pattern.

Clause 86. The UE of any of clauses 81 to 85, wherein individual slots associated with the first SFI are interleaved with individual slots associated with the second SFI.

Clause 87. The UE of any of clauses 81 to 86, wherein the SFI configuration includes a first contiguous group of slots including all of the first subset of slots associated with the first SFI, followed by a second contiguous group of slots including all of the second subset of slots associated with the second SFI.

Clause 88. The UE of clause 87, wherein a first number of slots among the first contiguous group of slots is the same as a second number of slots among the second contiguous group of slots.

Clause 89. The UE of any of clauses 87 to 88, wherein a first number of slots among each first contiguous group of slots is different than a second number of slots among each second contiguous group of slots.

Clause 90. The UE of any of clauses 81 to 89, wherein the SFI configuration includes first contiguous groups of slots associated with the first SFI that are interleaved with second contiguous groups of slots associated with the second SFI.

Clause 91. The UE of clause 90, wherein a first number of slots among each first contiguous group of slots is the same as a second number of slots among each second contiguous group of slots.

Clause 92. The UE of any of clauses 90 to 91, wherein a first number of slots among each first contiguous group of slots is different than a second number of slots among each second contiguous group of slots.

Clause 93. The UE of any of clauses 79 to 92, wherein the SFI configuration is received via downlink control information (DCI).

Clause 94. The UE of any of clauses 79 to 93, wherein the UE is preconfigured with a plurality of SFI configuration options for the plurality of slots, and wherein the receiving receives an indication of one of the plurality of SFI configuration options.

Clause 95. The UE of any of clauses 79 to 94, wherein the indication comprises a number of SFIs included in the SFI configuration, and wherein the SFI configuration is determined based on the number of SFIs and a pre-defined SFI-to-slot mapping rule.

Clause 96. The UE of clause 95, wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs.

Clause 97. The UE of any of clauses 95 to 96, wherein the indicated number of SFIs is UE-specific.

Clause 98. The UE of any of clauses 95 to 97, wherein the indication is received in association with fewer SFI indexes than the number of SFIs.

Clause 99. The UE of clause 98, wherein one or more SFI index fields are configured via radio resource control (RRC) configuration with reserved or invalid entries that are not associated with a respective SFI.

Clause 100. The UE of any of clauses 98 to 99, wherein the number of SFIs is indicated via a field in a downlink control information (DCI).

Clause 101. The UE of clause 100, wherein the number of SFIs is indicated via a bitmap that indicates whether a respective SFI index is valid, or wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Clause 102. A network entity, comprising: a memory; at least one transceiver; and at least one processor communicatively coupled to the memory and the at least one transceiver, the at least one processor configured to: determine a slot format indicator (SFI) configuration for a plurality of slots, the SFI configuration including a first SFI associated with a first subset of the plurality of slots and a second SFI associated with a second subset of the plurality of slots; transmit, via the at least one transceiver, an indication of the SFI configuration to a user equipment (UE); and communicate, via the at least one transceiver, with the UE on one or more of the plurality of slots in accordance with the SFI configuration.

Clause 103. The network entity of clause 102, wherein the plurality of slots includes at least each slot between two consecutive physical downlink control channel (PDCCH) occasions.

Clause 104. The network entity of any of clauses 102 to 103, wherein the first SFI is associated with a first slot repetition factor, and wherein the SFI is associated with a second slot repetition factor.

Clause 105. The network entity of clause 104, wherein the first and second slot repetition factors are the same.

Clause 106. The network entity of any of clauses 104 to 105, wherein the first and second slot repetition factors are different.

Clause 107. The network entity of any of clauses 104 to 106, wherein the SFI configuration designates an SFI slot pattern comprising the first and second SFIs that repeats at least partially across the plurality of slots.

Clause 108. The network entity of clause 107, wherein, upon reaching a respective slot repetition factor for a respective SFI, the respective SFI is removed from the SFI slot pattern for any subsequent repetitions of the SFI slot pattern.

Clause 109. The network entity of any of clauses 104 to 108, wherein individual slots associated with the first SFI are interleaved with individual slots associated with the second SFI.

Clause 110. The network entity of any of clauses 104 to 109, wherein the SFI configuration includes a first contiguous group of slots including all of the first subset of slots associated with the first SFI, followed by a second contiguous group of slots including all of the second subset of slots associated with the second SFI.

Clause 111. The network entity of clause 110, wherein a first number of slots among the first contiguous group of slots is the same as a second number of slots among the second contiguous group of slots.

Clause 112. The network entity of any of clauses 110 to 111, wherein a first number of slots among each first contiguous group of slots is different than a second number of slots among each second contiguous group of slots.

Clause 113. The network entity of any of clauses 104 to 112, wherein the SFI configuration includes first contiguous groups of slots associated with the first SFI that are interleaved with second contiguous groups of slots associated with the second SFI.

Clause 114. The network entity of clause 113, wherein a first number of slots among each first contiguous group of slots is the same as a second number of slots among each second contiguous group of slots.

Clause 115. The network entity of any of clauses 113 to 114, wherein a first number of slots among each first contiguous group of slots is different than a second number of slots among each second contiguous group of slots.

Clause 116. The network entity of any of clauses 102 to 115, wherein the SFI configuration is transmitted via downlink control information (DCI).

Clause 117. The network entity of any of clauses 102 to 116, wherein the UE is preconfigured with a plurality of SFI configuration options for the plurality of slots, and wherein the transmitting transmits an indication of one of the plurality of SFI configuration options.

Clause 118. The network entity of any of clauses 102 to 117, wherein the indication comprises a number of SFIs included in the SFI configuration, and wherein the SFI configuration is determined based on the number of SFIs and a pre-defined SFI-to-slot mapping rule.

Clause 119. The network entity of clause 118, wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs.

Clause 120. The network entity of any of clauses 118 to 119, wherein the indicated number of SFIs is UE-specific.

Clause 121. The network entity of any of clauses 118 to 120, wherein the indication is transmitted in association with fewer SFI indexes than the number of SFIs.

Clause 122. The network entity of clause 121, wherein one or more SFI index fields are configured via radio resource control (RRC) configuration with reserved or invalid entries that are not associated with a respective SFI.

Clause 123. The network entity of any of clauses 121 to 122, wherein the number of SFIs is indicated via a field in a downlink control information (DCI).

Clause 124. The network entity of clause 123, wherein the number of SFIs is indicated via a bitmap that indicates whether a respective SFI index is valid, or wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Clause 125. A user equipment (UE), comprising: means for receiving, from a network entity, an active bandwidth part (BWP) subcarrier spacing (SCS) value of an active BWP SCS that is 120 kHz or higher, and a reference SCS value of a reference SCS that is the same or lower than the active BWP SCS; means for determining a number of consecutive slots in the active BWP associated with the same slot format indicator (SFI) based on the active BWP SCS value and the reference SCS value; means for communicating with the network entity on one or more slots of the active BWP in accordance with the determination.

Clause 126. The UE of clause 125, wherein the active BWP corresponds to a downlink BWP.

Clause 127. The UE of any of clauses 125 to 126, wherein the active BWP corresponds to an uplink BWP.

Clause 128. The UE of any of clauses 125 to 127, wherein the active BWP SCS value is received via downlink control information (DCI).

Clause 129. The UE of any of clauses 125 to 128, wherein the reference SCS value is received via downlink control information (DCI).

Clause 130. The UE of any of clauses 125 to 129, wherein the active BWP SCS is 960 kHz or 480 kHz or 120 kHz, and wherein the reference SCS is 480 kHz, 240 kHz, 120 kHz, or less than 120 kHz.

Clause 131. The UE of any of clauses 125 to 130, wherein the reference SCS value has a maximum of three.

Clause 132. The UE of any of clauses 125 to 131, wherein reference SCS value is greater than three.

Clause 133. A network entity, comprising: means for determining an active bandwidth part (BWP) subcarrier spacing (SCS) value of an active BWP SCS that is 120 kHz or higher, and a reference SCS value of a reference SCS that is the same or lower than the active BWP SCS, wherein a number of consecutive slots in the active BWP associated with the same slot format indicator (SFI) is based on the active BWP SCS value and the reference SCS value; means for transmitting the active BWP SCS value and the reference SCS value to a user equipment (UE); and means for communicating with the UE on one or more slots of the active BWP in accordance with the SFI.

Clause 134. The network entity of clause 133, wherein the active BWP corresponds to a downlink BWP.

Clause 135. The network entity of any of clauses 133 to 134, wherein the active BWP corresponds to an uplink BWP.

Clause 136. The network entity of any of clauses 133 to 135, wherein the active BWP SCS value is transmitted via downlink control information (DCI).

Clause 137. The network entity of any of clauses 133 to 136, wherein the reference SCS value is transmitted via downlink control information (DCI).

Clause 138. The network entity of clause 137, wherein the active BWP SCS is 960 kHz or 480 kHz or 120 kHz, and wherein the reference SCS is 480 kHz, 240 kHz, 120 kHz, or less than 120 kHz.

Clause 139. The network entity of any of clauses 133 to 138, wherein the reference SCS value has a maximum of three.

Clause 140. The network entity of any of clauses 133 to 139, wherein reference SCS value is greater than three.

Clause 141. A UE, comprising: means for receiving, from a network entity, an indication of a slot format indicator (SFI) configuration for a plurality of slots, the SFI configuration including a first SFI associated with a first subset of the plurality of slots and a second SFI associated with a second subset of the plurality of slots; and means for communicating with the network entity on one or more of the plurality of slots in accordance with the SFI configuration.

Clause 142. The UE of clause 141, wherein the plurality of slots includes at least each slot between two consecutive physical downlink control channel (PDCCH) occasions.

Clause 143. The UE of any of clauses 141 to 142, wherein the first SFI is associated with a first slot repetition factor, and wherein the SFI is associated with a second slot repetition factor.

Clause 144. The UE of clause 143, wherein the first and second slot repetition factors are the same.

Clause 145. The UE of any of clauses 143 to 144, wherein the first and second slot repetition factors are different.

Clause 146. The UE of any of clauses 143 to 145, wherein the SFI configuration designates an SFI slot pattern comprising the first and second SFIs that repeats at least partially across the plurality of slots.

Clause 147. The UE of clause 146, wherein, upon reaching a respective slot repetition factor for a respective SFI, the respective SFI is removed from the SFI slot pattern for any subsequent repetitions of the SFI slot pattern.

Clause 148. The UE of any of clauses 143 to 147, wherein individual slots associated with the first SFI are interleaved with individual slots associated with the second SFI.

Clause 149. The UE of any of clauses 143 to 148, wherein the SFI configuration includes a first contiguous group of slots including all of the first subset of slots associated with the first SFI, followed by a second contiguous group of slots including all of the second subset of slots associated with the second SFI.

Clause 150. The UE of clause 149, wherein a first number of slots among the first contiguous group of slots is the same as a second number of slots among the second contiguous group of slots.

Clause 151. The UE of any of clauses 149 to 150, wherein a first number of slots among each first contiguous group of slots is different than a second number of slots among each second contiguous group of slots.

Clause 152. The UE of any of clauses 143 to 151, wherein the SFI configuration includes first contiguous groups of slots associated with the first SFI that are interleaved with second contiguous groups of slots associated with the second SFI.

Clause 153. The UE of clause 152, wherein a first number of slots among each first contiguous group of slots is the same as a second number of slots among each second contiguous group of slots.

Clause 154. The UE of any of clauses 152 to 153, wherein a first number of slots among each first contiguous group of slots is different than a second number of slots among each second contiguous group of slots.

Clause 155. The UE of any of clauses 141 to 154, wherein the SFI configuration is received via downlink control information (DCI).

Clause 156. The UE of any of clauses 141 to 155, wherein the UE is preconfigured with a plurality of SFI configuration options for the plurality of slots, and wherein the receiving receives an indication of one of the plurality of SFI configuration options.

Clause 157. The UE of any of clauses 141 to 156, wherein the indication comprises a number of SFIs included in the SFI configuration, and wherein the SFI configuration is determined based on the number of SFIs and a pre-defined SFI-to-slot mapping rule.

Clause 158. The UE of clause 157, wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs.

Clause 159. The UE of any of clauses 157 to 158, wherein the indicated number of SFIs is UE-specific.

Clause 160. The UE of any of clauses 157 to 159, wherein the indication is received in association with fewer SFI indexes than the number of SFIs.

Clause 161. The UE of clause 160, wherein one or more SFI index fields are configured via radio resource control (RRC) configuration with reserved or invalid entries that are not associated with a respective SFI.

Clause 162. The UE of any of clauses 160 to 161, wherein the number of SFIs is indicated via a field in a downlink control information (DCI).

Clause 163. The UE of clause 162, wherein the number of SFIs is indicated via a bitmap that indicates whether a respective SFI index is valid, or wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Clause 164. A network entity, comprising: means for determining a slot format indicator (SFI) configuration for a plurality of slots, the SFI configuration including a first SFI associated with a first subset of the plurality of slots and a second SFI associated with a second subset of the plurality of slots; means for transmitting an indication of the SFI configuration to a user equipment (UE); and means for communicating with the UE on one or more of the plurality of slots in accordance with the SFI configuration.

Clause 165. The network entity of clause 164, wherein the plurality of slots includes at least each slot between two consecutive physical downlink control channel (PDCCH) occasions.

Clause 166. The network entity of any of clauses 164 to 165, wherein the first SFI is associated with a first slot repetition factor, and wherein the SFI is associated with a second slot repetition factor.

Clause 167. The network entity of clause 166, wherein the first and second slot repetition factors are the same.

Clause 168. The network entity of any of clauses 166 to 167, wherein the first and second slot repetition factors are different.

Clause 169. The network entity of any of clauses 166 to 168, wherein the SFI configuration designates an SFI slot pattern comprising the first and second SFIs that repeats at least partially across the plurality of slots.

Clause 170. The network entity of clause 169, wherein, upon reaching a respective slot repetition factor for a respective SFI, the respective SFI is removed from the SFI slot pattern for any subsequent repetitions of the SFI slot pattern.

Clause 171. The network entity of any of clauses 166 to 170, wherein individual slots associated with the first SFI are interleaved with individual slots associated with the second SFI.

Clause 172. The network entity of any of clauses 166 to 171, wherein the SFI configuration includes a first contiguous group of slots including all of the first subset of slots associated with the first SFI, followed by a second contiguous group of slots including all of the second subset of slots associated with the second SFI.

Clause 173. The network entity of clause 172, wherein a first number of slots among the first contiguous group of slots is the same as a second number of slots among the second contiguous group of slots.

Clause 174. The network entity of any of clauses 172 to 173, wherein a first number of slots among each first contiguous group of slots is different than a second number of slots among each second contiguous group of slots.

Clause 175. The network entity of any of clauses 166 to 174, wherein the SFI configuration includes first contiguous groups of slots associated with the first SFI that are interleaved with second contiguous groups of slots associated with the second SFI.

Clause 176. The network entity of clause 175, wherein a first number of slots among each first contiguous group of slots is the same as a second number of slots among each second contiguous group of slots.

Clause 177. The network entity of any of clauses 175 to 176, wherein a first number of slots among each first contiguous group of slots is different than a second number of slots among each second contiguous group of slots.

Clause 178. The network entity of any of clauses 164 to 177, wherein the SFI configuration is transmitted via downlink control information (DCI).

Clause 179. The network entity of any of clauses 164 to 178, wherein the UE is preconfigured with a plurality of SFI configuration options for the plurality of slots, and wherein the transmitting transmits an indication of one of the plurality of SFI configuration options.

Clause 180. The network entity of any of clauses 164 to 179, wherein the indication comprises a number of SFIs included in the SFI configuration, and wherein the SFI configuration is determined based on the number of SFIs and a pre-defined SFI-to-slot mapping rule.

Clause 181. The network entity of clause 180, wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs.

Clause 182. The network entity of any of clauses 180 to 181, wherein the indicated number of SFIs is UE-specific.

Clause 183. The network entity of any of clauses 180 to 182, wherein the indication is transmitted in association with fewer SFI indexes than the number of SFIs.

Clause 184. The network entity of clause 183, wherein one or more SFI index fields are configured via radio resource control (RRC) configuration with reserved or invalid entries that are not associated with a respective SFI.

Clause 185. The network entity of any of clauses 183 to 184, wherein the number of SFIs is indicated via a field in a downlink control information (DCI).

Clause 186. The network entity of clause 185, wherein the number of SFIs is indicated via a bitmap that indicates whether a respective SFI index is valid, or wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Clause 187. A non-transitory computer-readable medium storing computer-executable instructions that, when executed by a user equipment (UE), cause the UE to: receive, from a network entity, an active bandwidth part (BWP) subcarrier spacing (SCS) value of an active BWP SCS that is 120 kHz or higher, and a reference SCS value of a reference SCS that is the same or lower than the active BWP SCS; determine a number of consecutive slots in the active BWP associated with the same slot format indicator (SFI) based on the active BWP SCS value and the reference SCS value; communicate with the network entity on one or more slots of the active BWP in accordance with the determination.

Clause 188. The non-transitory computer-readable medium of clause 187, wherein the active BWP corresponds to a downlink BWP.

Clause 189. The non-transitory computer-readable medium of any of clauses 187 to 188, wherein the active BWP corresponds to an uplink BWP.

Clause 190. The non-transitory computer-readable medium of any of clauses 187 to 189, wherein the active BWP SCS value is received via downlink control information (DCI).

Clause 191. The non-transitory computer-readable medium of any of clauses 187 to 190, wherein the reference SCS value is received via downlink control information (DCI).

Clause 192. The non-transitory computer-readable medium of any of clauses 187 to 191, wherein the active BWP SCS is 960 kHz or 480 kHz or 120 kHz, and wherein the reference SCS is 480 kHz, 240 kHz, 120 kHz, or less than 120 kHz.

Clause 193. The non-transitory computer-readable medium of any of clauses 187 to 192, wherein the reference SCS value has a maximum of three.

Clause 194. The non-transitory computer-readable medium of any of clauses 187 to 193, wherein reference SCS value is greater than three.

Clause 195. A non-transitory computer-readable medium storing computer-executable instructions that, when executed by a network entity, cause the network entity to: determine an active bandwidth part (BWP) subcarrier spacing (SCS) value of an active BWP SCS that is 120 kHz or higher, and a reference SCS value of a reference SCS that is the same or lower than the active BWP SCS, wherein a number of consecutive slots in the active BWP associated with the same slot format indicator (SFI) is based on the active BWP SCS value and the reference SCS value; transmit the active BWP SCS value and the reference SCS value to a user equipment (UE); and communicate with the UE on one or more slots of the active BWP in accordance with the SFI.

Clause 196. The non-transitory computer-readable medium of clause 195, wherein the active BWP corresponds to a downlink BWP.

Clause 197. The non-transitory computer-readable medium of any of clauses 195 to 196, wherein the active BWP corresponds to an uplink BWP.

Clause 198. The non-transitory computer-readable medium of any of clauses 195 to 197, wherein the active BWP SCS value is transmitted via downlink control information (DCI).

Clause 199. The non-transitory computer-readable medium of any of clauses 195 to 198, wherein the reference SCS value is transmitted via downlink control information (DCI).

Clause 200. The non-transitory computer-readable medium of clause 199, wherein the active BWP SCS is 960 kHz or 480 kHz or 120 kHz, and wherein the reference SCS is 480 kHz, 240 kHz, 120 kHz, or less than 120 kHz.

Clause 201. The non-transitory computer-readable medium of any of clauses 195 to 200, wherein the reference SCS value has a maximum of three.

Clause 202. The non-transitory computer-readable medium of any of clauses 195 to 201, wherein reference SCS value is greater than three.

Clause 203. A non-transitory computer-readable medium storing computer-executable instructions that, when executed by a UE, cause the UE to: receive, from a network entity, an indication of a slot format indicator (SFI) configuration for a plurality of slots, the SFI configuration including a first SFI associated with a first subset of the plurality of slots and a second SFI associated with a second subset of the plurality of slots; and communicate with the network entity on one or more of the plurality of slots in accordance with the SFI configuration.

Clause 204. The non-transitory computer-readable medium of clause 203, wherein the plurality of slots includes at least each slot between two consecutive physical downlink control channel (PDCCH) occasions.

Clause 205. The non-transitory computer-readable medium of any of clauses 203 to 204, wherein the first SFI is associated with a first slot repetition factor, and wherein the SFI is associated with a second slot repetition factor.

Clause 206. The non-transitory computer-readable medium of clause 205, wherein the first and second slot repetition factors are the same.

Clause 207. The non-transitory computer-readable medium of any of clauses 205 to 206, wherein the first and second slot repetition factors are different.

Clause 208. The non-transitory computer-readable medium of any of clauses 205 to 207, wherein the SFI configuration designates an SFI slot pattern comprising the first and second SFIs that repeats at least partially across the plurality of slots.

Clause 209. The non-transitory computer-readable medium of clause 208, wherein, upon reaching a respective slot repetition factor for a respective SFI, the respective SFI is removed from the SFI slot pattern for any subsequent repetitions of the SFI slot pattern.

Clause 210. The non-transitory computer-readable medium of any of clauses 205 to 209, wherein individual slots associated with the first SFI are interleaved with individual slots associated with the second SFI.

Clause 211. The non-transitory computer-readable medium of any of clauses 205 to 210, wherein the SFI configuration includes a first contiguous group of slots including all of the first subset of slots associated with the first SFI, followed by a second contiguous group of slots including all of the second subset of slots associated with the second SFI.

Clause 212. The non-transitory computer-readable medium of clause 211, wherein a first number of slots among the first contiguous group of slots is the same as a second number of slots among the second contiguous group of slots.

Clause 213. The non-transitory computer-readable medium of any of clauses 211 to 212, wherein a first number of slots among each first contiguous group of slots is different than a second number of slots among each second contiguous group of slots.

Clause 214. The non-transitory computer-readable medium of any of clauses 205 to 213, wherein the SFI configuration includes first contiguous groups of slots associated with the first SFI that are interleaved with second contiguous groups of slots associated with the second SFI.

Clause 215. The non-transitory computer-readable medium of clause 214, wherein a first number of slots among each first contiguous group of slots is the same as a second number of slots among each second contiguous group of slots.

Clause 216. The non-transitory computer-readable medium of any of clauses 214 to 215, wherein a first number of slots among each first contiguous group of slots is different than a second number of slots among each second contiguous group of slots.

Clause 217. The non-transitory computer-readable medium of any of clauses 203 to 216, wherein the SFI configuration is received via downlink control information (DCI).

Clause 218. The non-transitory computer-readable medium of any of clauses 203 to 217, wherein the UE is preconfigured with a plurality of SFI configuration options for the plurality of slots, and wherein the receiving receives an indication of one of the plurality of SFI configuration options.

Clause 219. The non-transitory computer-readable medium of any of clauses 203 to 218, wherein the indication comprises a number of SFIs included in the SFI configuration, and wherein the SFI configuration is determined based on the number of SFIs and a pre-defined SFI-to-slot mapping rule.

Clause 220. The non-transitory computer-readable medium of clause 219, wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs.

Clause 221. The non-transitory computer-readable medium of any of clauses 219 to 220, wherein the indicated number of SFIs is UE-specific.

Clause 222. The non-transitory computer-readable medium of any of clauses 219 to 221, wherein the indication is received in association with fewer SFI indexes than the number of SFIs.

Clause 223. The non-transitory computer-readable medium of clause 222, wherein one or more SFI index fields are configured via radio resource control (RRC) configuration with reserved or invalid entries that are not associated with a respective SFI.

Clause 224. The non-transitory computer-readable medium of any of clauses 222 to 223, wherein the number of SFIs is indicated via a field in a downlink control information (DCI).

Clause 225. The non-transitory computer-readable medium of clause 224, wherein the number of SFIs is indicated via a bitmap that indicates whether a respective SFI index is valid, or wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Clause 226. A non-transitory computer-readable medium storing computer-executable instructions that, when executed by a network entity, cause the network entity to: determine a slot format indicator (SFI) configuration for a plurality of slots, the SFI configuration including a first SFI associated with a first subset of the plurality of slots and a second SFI associated with a second subset of the plurality of slots; transmit an indication of the SFI configuration to a user equipment (UE); and communicate with the UE on one or more of the plurality of slots in accordance with the SFI configuration.

Clause 227. The non-transitory computer-readable medium of clause 226, wherein the plurality of slots includes at least each slot between two consecutive physical downlink control channel (PDCCH) occasions.

Clause 228. The non-transitory computer-readable medium of any of clauses 226 to 227, wherein the first SFI is associated with a first slot repetition factor, and wherein the SFI is associated with a second slot repetition factor.

Clause 229. The non-transitory computer-readable medium of clause 228, wherein the first and second slot repetition factors are the same.

Clause 230. The non-transitory computer-readable medium of any of clauses 228 to 229, wherein the first and second slot repetition factors are different.

Clause 231. The non-transitory computer-readable medium of any of clauses 228 to 230, wherein the SFI configuration designates an SFI slot pattern comprising the first and second SFIs that repeats at least partially across the plurality of slots.

Clause 232. The non-transitory computer-readable medium of clause 231, wherein, upon reaching a respective slot repetition factor for a respective SFI, the respective SFI is removed from the SFI slot pattern for any subsequent repetitions of the SFI slot pattern.

Clause 233. The non-transitory computer-readable medium of any of clauses 228 to 232, wherein individual slots associated with the first SFI are interleaved with individual slots associated with the second SFI.

Clause 234. The non-transitory computer-readable medium of any of clauses 228 to 233, wherein the SFI configuration includes a first contiguous group of slots including all of the first subset of slots associated with the first SFI, followed by a second contiguous group of slots including all of the second subset of slots associated with the second SFI.

Clause 235. The non-transitory computer-readable medium of clause 234, wherein a first number of slots among the first contiguous group of slots is the same as a second number of slots among the second contiguous group of slots.

Clause 236. The non-transitory computer-readable medium of any of clauses 234 to 235, wherein a first number of slots among each first contiguous group of slots is different than a second number of slots among each second contiguous group of slots.

Clause 237. The non-transitory computer-readable medium of any of clauses 228 to 236, wherein the SFI configuration includes first contiguous groups of slots associated with the first SFI that are interleaved with second contiguous groups of slots associated with the second SFI.

Clause 238. The non-transitory computer-readable medium of clause 237, wherein a first number of slots among each first contiguous group of slots is the same as a second number of slots among each second contiguous group of slots.

Clause 239. The non-transitory computer-readable medium of any of clauses 237 to 238, wherein a first number of slots among each first contiguous group of slots is different than a second number of slots among each second contiguous group of slots.

Clause 240. The non-transitory computer-readable medium of any of clauses 226 to 239, wherein the SFI configuration is transmitted via downlink control information (DCI).

Clause 241. The non-transitory computer-readable medium of any of clauses 226 to 240, wherein the UE is preconfigured with a plurality of SFI configuration options for the plurality of slots, and wherein the transmitting transmits an indication of one of the plurality of SFI configuration options.

Clause 242. The non-transitory computer-readable medium of any of clauses 226 to 241, wherein the indication comprises a number of SFIs included in the SFI configuration, and wherein the SFI configuration is determined based on the number of SFIs and a pre-defined SFI-to-slot mapping rule.

Clause 243. The non-transitory computer-readable medium of clause 242, wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs.

Clause 244. The non-transitory computer-readable medium of any of clauses 242 to 243, wherein the indicated number of SFIs is UE-specific.

Clause 245. The non-transitory computer-readable medium of any of clauses 242 to 244, wherein the indication is transmitted in association with fewer SFI indexes than the number of SFIs.

Clause 246. The non-transitory computer-readable medium of clause 245, wherein one or more SFI index fields are configured via radio resource control (RRC) configuration with reserved or invalid entries that are not associated with a respective SFI.

Clause 247. The non-transitory computer-readable medium of any of clauses 245 to 246, wherein the number of SFIs is indicated via a field in a downlink control information (DCI).

Clause 248. The non-transitory computer-readable medium of clause 247, wherein the number of SFIs is indicated via a bitmap that indicates whether a respective SFI index is valid, or wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
one or more memories; and
one or more processors coupled to the one or more memories, the one or more processors individually or collectively configured to cause the UE to:
receive, from a network entity, an indication of a slot format indicator (SFI) configuration for a plurality of slots, the SFI configuration including a first SFI associated with a first subset of the plurality of slots and a second SFI associated with a second subset of the plurality of slots, wherein:
the SFI configuration designates an SFI slot pattern comprising the first and second SFIs that repeats at least partially across the plurality of slots, and
upon reaching a respective slot repetition factor for a respective SFI, the respective SFI is removed from the SFI slot pattern for any subsequent repetitions of the SFI slot pattern; and
communicate with the network entity on one or more of the plurality of slots in accordance with the SFI configuration.

2. The UE of claim 1,
wherein the plurality of slots includes at least each slot between two consecutive physical downlink control channel (PDCCH) occasions, or
wherein the first SFI is associated with a first slot repetition factor, and the second SFI is associated with a second slot repetition factor, or
a combination thereof.

3. The UE of claim 1,
wherein individual slots associated with the first SFI are interleaved with individual slots associated with the second SFI, or
wherein the SFI configuration includes a first contiguous group of slots including all of the first subset of slots associated with the first SFI, followed by a second contiguous group of slots including all of the second subset of slots associated with the second SFI, or
a combination thereof.

4. The UE of claim 1, wherein the SFI configuration includes first contiguous groups of slots associated with the first SFI that are interleaved with second contiguous groups of slots associated with the second SFI.

5. The UE of claim 1,
wherein the SFI configuration is received via downlink control information (DCI), or
wherein the UE is preconfigured with a plurality of SFI configuration options for the plurality of slots, and the receiving receives an indication of one of the plurality of SFI configuration options.

6. A user equipment (UE), comprising:
one or more memories; and
one or more processors coupled to the one or more memories, the one or more processors individually or collectively configured to cause the UE to:
receive, from a network entity, an indication of a slot format indicator (SFI) configuration for a plurality of slots, the SFI configuration including a first SFI associated with a first subset of the plurality of slots and a second SFI associated with a second subset of the plurality of slots, wherein:
the indication comprises a number of SFIs included in the SFI configuration, and
the SFI configuration is determined based on the number of SFIs and a pre-defined SFI-to-slot mapping rule; and
communicate with the network entity on one or more of the plurality of slots in accordance with the SFI configuration.

7. The UE of claim 6,
wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs, or
wherein the indicated number of SFIs is UE-specific, or
wherein the indication is received in association with fewer SFI indexes than the number of SFIs, or
any combination thereof.

8. The UE of claim 7,
wherein one or more SFI index fields are configured via radio resource control (RRC) configuration with reserved or invalid entries that are not associated with a respective SFI, or wherein the number of SFIs is indicated via a field in a downlink control information (DCI).

9. The UE of claim 8,
wherein the number of SFIs is indicated via a bitmap that indicates whether a respective SFI index is valid, or
wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

10. A network entity, comprising:
one or more memories; and
one or more processors coupled to the one or more memories, the one or more processors individually or collectively configured to cause the network entity to:
  determine a slot format indicator (SFI) configuration for a plurality of slots, the SFI configuration including a first SFI associated with a first subset of the plurality of slots and a second SFI associated with a second subset of the plurality of slots, wherein:
    the SFI configuration designates an SFI slot pattern comprising the first and second SFIs that repeats at least partially across the plurality of slots
    upon reaching a respective slot repetition factor for a respective SFI, the respective SFI is removed from the SFI slot pattern for any subsequent repetitions of the SFI slot pattern;
  transmit an indication of the SFI configuration to a user equipment (UE); and
  communicate with the UE on one or more of the plurality of slots in accordance with the SFI configuration.

11. The network entity of claim 10,
wherein the plurality of slots includes at least each slot between two consecutive physical downlink control channel (PDCCH) occasions,
wherein the first SFI is associated with a first slot repetition factor, and the second SFI is associated with a second slot repetition factor, or
a combination thereof.

12. The network entity of claim 10,
wherein individual slots associated with the first SFI are interleaved with individual slots associated with the second SFI, or
wherein the SFI configuration includes a first contiguous group of slots including all of the first subset of slots associated with the first SFI, followed by a second contiguous group of slots including all of the second subset of slots associated with the second SFI, or
a combination thereof.

13. The network entity of claim 12, wherein the SFI configuration includes first contiguous groups of slots associated with the first SFI that are interleaved with second contiguous groups of slots associated with the second SFI.

14. The network entity of claim 12, wherein a first number of slots among each first contiguous group of slots is the same as a second number of slots among each second contiguous group of slots.

15. The network entity of claim 10, wherein a first number of slots among each first contiguous group of slots is different than a second number of slots among each second contiguous group of slots.

16. The network entity of claim 10,
wherein the SFI configuration is transmitted via downlink control information (DCI), or wherein the UE is preconfigured with a plurality of SFI configuration options for the plurality of slots, and the transmitting transmits an indication of one of the plurality of SFI configuration options.

17. The network entity of claim 10,
wherein the indication comprises a number of SFIs included in the SFI configuration, and
wherein the SFI configuration is determined based on the number of SFIs and a pre-defined SFI-to-slot mapping rule.

18. The network entity of claim 17,
wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs, or
wherein the indicated number of SFIs is UE-specific, or
wherein the indication is transmitted in association with fewer SFI indexes than the number of SFIs, or
any combination thereof.

19. The network entity of claim 18,
wherein one or more SFI index fields are configured via radio resource control (RRC) configuration with reserved or invalid entries that are not associated with a respective SFI, or
wherein the number of SFIs is indicated via a field in a downlink control information (DCI).

20. The network entity of claim 19,
wherein the number of SFIs is indicated via a bitmap that indicates whether a respective SFI index is valid, or
wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

21. A method of operating a user equipment (UE), comprising:
  receiving, from a network entity, an indication of a slot format indicator (SFI) configuration for a plurality of slots, the SFI configuration including a first SFI associated with a first subset of the plurality of slots and a second SFI associated with a second subset of the plurality of slots, wherein:
    the SFI configuration designates an SFI slot pattern comprising the first and second SFIs that repeats at least partially across the plurality of slots, and
    upon reaching a respective slot repetition factor for a respective SFI, the respective SFI is removed from the SFI slot pattern for any subsequent repetitions of the SFI slot pattern; and
  communicating with the network entity on one or more of the plurality of slots in accordance with the SFI configuration.

22. The method of claim 21,
wherein the plurality of slots includes at least each slot between two consecutive physical downlink control channel (PDCCH) occasions, or
wherein the first SFI is associated with a first slot repetition factor, and the second SFI is associated with a second slot repetition factor, or
a combination thereof.

23. The method of claim 21,
wherein individual slots associated with the first SFI are interleaved with individual slots associated with the second SFI, or wherein the SFI configuration includes a first contiguous group of slots including all of the first subset of slots associated with the first SFI, followed by a second contiguous group of slots including all of the second subset of slots associated with the second SFI, or a combination thereof.

24. The method of claim 21, wherein the SFI configuration includes first contiguous groups of slots associated with the first SFI that are interleaved with second contiguous groups of slots associated with the second SFI.

25. The method of claim 21,
wherein the SFI configuration is received via downlink control information (DCI), or
wherein the UE is preconfigured with a plurality of SFI configuration options for the plurality of slots, and the receiving receives an indication of one of the plurality of SFI configuration options.

26. The method of claim 21, wherein the indication comprises a number of SFIs included in the SFI configuration, and wherein the SFI configuration is determined based on the number of SFIs and a pre-defined SFI-to-slot mapping rule.

27. The method of claim 26,
wherein the pre-defined SFI-to-slot mapping rule divides the plurality of slots by the indicated number of SFIs to obtain a plurality of contiguous groups of slots, and assigns one of the plurality of contiguous groups to each of a plurality of SFIs, or
wherein the indicated number of SFIs is UE-specific, or
wherein the indication is received in association with fewer SFI indexes than the number of SFIs, or
any combination thereof.

28. The method of claim 27,
wherein one or more SFI index fields are configured via radio resource control (RRC) configuration with reserved or invalid entries that are not associated with a respective SFI, or
wherein the number of SFIs is indicated via a field in a downlink control information (DCI).

29. The method of claim 28,
wherein the number of SFIs is indicated via a bitmap that indicates whether a respective SFI index is valid, or
wherein the number of SFIs is indicated via a value that specifies a number of valid indexes, with that SFIs corresponding to SFI indexes being interpreted as valid starting from an initial SFI index until the value is reached, with SFIs corresponding to SFI indexes after the value is reached being interpreted as invalid.

* * * * *